United States Patent [19]

Kaufman

[11] Patent Number: 5,038,302
[45] Date of Patent: Aug. 6, 1991

[54] METHOD OF CONVERTING CONTINUOUS THREE-DIMENSIONAL GEOMETRICAL REPRESENTATIONS INTO DISCRETE THREE-DIMENSIONAL VOXEL-BASED REPRESENTATIONS WITHIN A THREE-DIMENSIONAL VOXEL-BASED SYSTEM

[75] Inventor: Arie E. Kaufman, Plainview, N.Y.

[73] Assignee: The Research Foundation of State University of New York, Albany, N.Y.

[21] Appl. No.: 224,545

[22] Filed: Jul. 26, 1988

[51] Int. Cl.$^5$ .............................................. G06F 15/62
[52] U.S. Cl. ................................... 364/522; 364/521; 364/518; 340/747; 340/729
[58] Field of Search .............. 364/518, 521, 522, 512; 340/750, 799, 747, 728, 729

[56] References Cited

U.S. PATENT DOCUMENTS 4,719,585  1/1988  Cline et al. ........................... 364/518
4,791,567  12/1988  Cline et al. ...................... 364/413.13
4,791,582  12/1988  Ueda et al. .......................... 364/522

Primary Examiner—Gary V. Markcom
Assistant Examiner—Phu K. Nguyen
Attorney, Agent, or Firm—Hoffmann & Baron

[57] ABSTRACT

Method of converting continuous 3-D geometrical representations into a discrete set of voxels in discrete 3-D voxel space. In one embodiment, a method is provided for converting a continuous 3-D straight line segment into a discrete set of voxels connected together in discrete 3-D voxel space. In another embodiment, a method is provided for converting a continuous 3-D parametric polynomial curve segment into a discrete set of voxels connected together in discrete 3-D voxel space. In an alternative embodiment, a method is provided for converting a continuous 3-D parametric polynomial surface patch into a discrete set of voxels connected together in discrete 3-D voxel space. Yet in another embodiment of the present invention, a method is provided for converting a continuous 3-D parametric polynomial volume element into a discrete set of voxels connected together in discrete 3-D voxel space. The method of the present invention is incremental in nature and uses all integer arithmetic. The method of the present invention is also characterized by symmetrical decisional process loops using substantially the same decisional process logic in each of the x, y and z coordinate directions, and thus is capable of generating discrete sets of voxels having a variety of connectivities.

15 Claims, 18 Drawing Sheets

3D Voxel-Based Model in $Z^3$ Space

CONTINUOUS 3-D
GEOMETRIC-OBJECT
SPACE ($R^3$ SPACE)

DISCRETE 3-D
VOXEL-IMAGE SPACE
($Z^3$ SPACE)

```
Δx = x₂ - x₁; Δy = y₂ - y₁; Δz = z₂ - z₁;
n = MAX(Δx, Δy, Δz);
" Initialization for x, y, and z "
x = x₁;
eₓ = 2 * Δx - n;                    " error variable along x "
d1ₓ = 2 * Δx;                       " increment along x for eₓ < 0 "
d2ₓ = 2 * (Δx - n);                 " increment along x for eₓ ≥ 0 "

y = y₁;
e_y = 2 * Δy - n;                   " error variable along y "
d1_y = 2 * Δy;                      " increment along y for e_y < 0 "
d2_y = 2 * (Δy - n);                " increment along y for e_y ≥ 0 "

z = z₁;
e_z = 2 * Δz - n;                   " error variable along z "
d1_z = 2 * Δz;                      " increment along z for e_z < 0 "
d2_z = 2 * (Δz - n);                " increment along z for e_z ≥ 0 "
WRITE_VOXEL (x, y, z, c);           " first endpoint of line "
for (i = 1; i ≤ n; i++)             " follow the line "
{
    if(eₓ < 0)                      " then: no change in x "
        eₓ += d1ₓ;                  " update eₓ "
    else {
        eₓ += d2ₓ;                  "update eₓ, and "
        x++;                        " step in x "
    }
    if(e_y < 0)                     " then: no change in y "
        e_y += d1_y;                " update e_y "
    else {
        e_y += d2_y;                " update e_y, and "
        y++;                        " step in y "
    }
    if(e_z < 0)                     " then: no change in z "
        e_z += d1_z;                " update e_z "
    else {
        e_z += d2_z;                " update e_z, and "
        z++;                        " step in z "
    }
    WRITE_VOXEL (x, y, z, c);       " next voxel near line "
}
```

FIG. 9B

```
Δx = x₂ - x₁; Δy = y₂ - y₁; Δz = z₂ - z₁;
n = MAX(MAX(Δx, Δy, Δz), CEILING((Δx + Δy + Δz)/2));
x = x₁;  y = y₁;  z = z₁;
eₓ = 2 * Δx - n;                    " error variable along x "
d1ₓ = 2 * Δx;                       " increment along x for eₓ < 0 "
d2ₓ = 2 * (Δx - n);                 " increment along x for eₓ ≥ 0 "

e_y = 2 * Δy - n;                   " error variable along y "
d1_y = 2 * Δy;                      " increment along y for e_y < 0 "
d2_y = 2 * (Δy - n);                " increment along y for e_y ≥ 0 "

e_z = 2 * Δz - n;                   " error variable along z "
d1_z = 2 * Δz;                      " increment along z for e_z < 0 "
d2_z = 2 * (Δz - n);                " increment along z for e_z ≥ 0 "
WRITE_VOXEL (x, y, z, c);           " first endpoint of line "

for (i = 1; i ≤ n; i++){            " follow the line "
    if(eₓ < e_y && eₓ < e_z){       " eₓ smallest, step in y and/or z "
        if(e_y < 0) e_y += d1_y;    " update e_y "
        else { e_y += d2_y; y++;}   " step in y "
        if(e_z < 0) e_z += d1_z;    " update e_z "
        else { e_z += d2_z; z++;}   " step in z "
        eₓ += d1ₓ;
    }
    else if(e_y < eₓ && e_y < e_z){ " e_y smallest, step in x and/or z "
        if(eₓ < 0) eₓ += d1ₓ;       " update eₓ "
        else {eₓ += d2ₓ; x++;}      " step in x "
        if(e_z < 0) e_z += d1_z;    " update e_z "
        else{e_z += d2_z; z++;}     " step in z "
        e_y += d1_y;
    }
    else{                           " e_z smallest, step in x and/or y "
        if(eₓ < 0) eₓ += d1_z;)     " update eₓ "
        else{eₓ += d2ₓ; x++;};      " step in x "
        if(e_y < 0) e_y += d1_y:    " update e_y "
        else { e_y += d2_y; y++;}   " step in y "
        e_z += d1_z;
    }
    WRITE_VOXEL (x, y, z, c);       " next voxel near line "
}
```

FIG. 9D

```
Δx = x₂ - x₁;  Δy = y₂ - y₁;  Δz = z₂ - z₁;
n = Δx + Δy + Δz;
" Initialization for x, y, and z "
x = x₁;
cₓ = 2 * Δx - n;                    " error variable along x "
d1ₓ = 2 * Δx;                       " increment along x for cₓ < 0 "
d2ₓ = 2 * (Δx - n);                 " increment along x for cₓ ≥ 0 "

y = y₁;
c_y = 2 * Δy - n;                   " error variable along y "
d1_y = 2 * Δy;                      " increment along y for c_y < 0 "
d2_y = 2 * (Δy - n);                " increment along y for c_y ≥ 0 "

z = z₁;
c_z = 2 * Δz - n;                   " error variable along z "
d1_z = 2 * Δz;                      " increment along z for c_z < 0 "
d2_z = 2 * (Δz - n);                " increment along z for c_z ≥ 0 "
WRITE_VOXEL (x, y, z, c);           " first endpoint of line "

for (i = 1; i ≤ n; i++)             " follow the line "
{
    if(cₓ ≥ c_y && cₓ ≥ c_z){       " cₓ is the largest "
        cₓ += d2ₓ;
        c_y += d1_y;
        c_z += d1_z;
        x++;                        " step in x "
    }
    else if (c_y ≥ c_z && c_y ≥ cₓ){ " c_y is the largest "
        cₓ += d1ₓ;
        c_y += d2_y;                " update c_y, and "
        c_z += d1_z;
        y++;                        " step in y "
    }
    else{                           " c_z is the largest "
        cₓ += d1ₓ;
        c_y += d1_y;
        c_z += d2_z;                " update c_z, and "
        z++;                        " step in z "
    }
    WRITE_VOXEL (x, y, z, c);       " next voxel near line "
}
```

FIG. 9E

CURVE IN 3-D GEOMETRIC SPACE $R^3$

3-D SCAN—CONVERSION PROCESS

CURVE IN 3-D VOXEL SPACE $Z^3$

Find maximum absolute value of dx/dt, dy/dt, dz/dt for
$0 \leq t \leq 1$(Eqs. 10–12), set n to maximum of these maxima;
Calculate initial difference vectors $\Delta x_0$, $\Delta y_0$, $\Delta z_0$ by Eq. 14;
Set $\Delta^0 x$, $\Delta^0 y$, $\Delta^0 z$ to 0;

```
NEW_POS (g[0][0], g[1][0], g[2][0]);              "start point"

for (t = 0; t ≤ n; t++){                          "follow the curve"
    if (Δ⁰x > n³){                                "decision for x"
        UPDATE_POS(X,1);                          "increment x"
        Δ⁰x -= 2n³; }
    else if (Δ⁰x < -n³){
        UPDATE_POS (X,-1);                        "decrement x"
        Δ⁰x += 2n³; }
    Δ⁰x += Δ¹x;
    Δ¹x += Δ²x;
    Δ²x += Δ³x;
    if (Δ⁰y > n³)                                 "decision for y"
        UPDATE_POS (Y,1);                         "increment y"
        Δ⁰y -= 2n³; }
    else if (Δ⁰y < -n₃){
        UPDATE_POS(Y,-1)                          "decrement y"
        Δ⁰y += 2n³; }
    Δ⁰y += Δ¹y;
    Δ¹y += Δ²y;
    Δ²y += Δ³y;
    if (Δ⁰z > n³){                                "decision for z"
        UPDATE_POS (Z,1)                          "increment z"
        Δ⁰z -= 2n³; }
    else if (Δ⁰z < -n³){
        UPDATE_POS (Z,-1);                        "decrement z"
        Δ⁰z += 2n³; }
    Δ⁰z += Δ¹z;
    Δ⁰z += Δ²z;
    Δ⁰z += Δ³z;

PUT_VOXEL ();                                 "in CFB"
}
```

FIG. 10A

3-D GEOMETRIC SPACE $R^3$

⬇ 3-D SCAN CONVERSION PROCESS

3-D VOXEL SPACE $Z^3$

Find n and m as described by Eq. 21;
Find initial difference matrices $\Delta x_{tu}$, $\Delta y_{tu}$, $\Delta z_{tu}$ using Eq. 17;
Set $\Delta^{00} x_{tu}$, $\Delta^{00} y_{tu}$, $\Delta^{00} z_{tu}$ to 0;
$x_u = g[0][0][0]$;
$y_u = g[1][0][0]$;
$z_u = g[2][0][0]$;

```
for (u = 0; u ≤ m; u++){
    NEW_POS(x_u, y_u, z_u);                          "start point"
    Copy column 0 of Δx_tu to Δx_t;   Set Δ⁰x_t to 0;
    Copy column 0 of Δy_tu to Δy_t;   Set Δ⁰y_t to 0;
    Copy column 0 of Δz_tu to Δz_t;   Set Δ⁰z_t to 0;
    for (t = 0; t ≤ n; t++){                         "follow f(*,u)"
        if (Δ⁰x_t > n³m³){
            UPDATE_POS(X,1);
            Δ⁰x_t -= 2n³m³;
        }
        else if (Δ⁰x_t , -n³m³){
            UPDATE_POS(X,-1);
            Δ⁰x_t += 2n³m³;
        }
        Δ⁰x_t += Δ¹x_t;
        Δ¹x_t += Δ²x_t;
        Δ²x_t += Δ³x_t;
        Same decisions for Δy_t and Δz_t;
        PUT_VOXEL();
    }
    Update Δx_tu : col 0 += col 1;
                   col 1 += col 2;
                   col 2 += col 3;
    Same update for Δy_tu and Δz_tu;
    if (Δ⁰⁰x_tu > n³m³){                             "decision for f(0,*)"
        x_u ++;
        Δ⁰⁰x_tu -= 2n³m³;
    }
    else if (Δ⁰⁰x_tu < -n³m³){
        x_u --;
        Δ⁰⁰x_tu += 2n³m³;
    }
    Same decisions for Δy_tu and Δz_tu;
}
```

FIG. 11A

3-D GEOMETRIC SPACE $R^3$

3-D SCAN-CONVERSION PROCESS

3-D VOXEL SPACE $Z^3$

Find n, m, l; Find initial matrices $\Delta x_{tuv}$, $\Delta y_{tuv}$, $\Delta z_{tuv}$;
Set $\Delta^{000}x_{tuv}$, $\Delta^{000}y_{tuv}$, $\Delta^{000}z_{tuv}$ to 0;
$x_v = g[0][0][0][0]$; $y_v = g[1][0][0][0]$; $z_v = g[2][0][0][0]$;
for $(v = 0)$; $v \leq l$; $v$++){
    $\Delta x_{tu} = 0$ $t-u$ layer of $\Delta x_{tuv}$;
    $\Delta y_{tu} = 0$ $t-u$ layer of $\Delta y_{tuv}$;
    $\Delta z_{tu} = 0$ $t-u$ layer of $\Delta z_{tuv}$;

Set $\Delta^{00}x_{tu}$, $\Delta^{00}y_{tu}$, $\Delta^{00}z_{tu}$ to 0;
    $x_u = x_v$ ; $y_u = y_v$ ; $z_u = z_v$ ;
    for $(u = 0; u \leq m; u$++){     "surface $f(*,*,v)$"
        NEW_POS$(x_u, y_u, z_u)$;
        $\Delta x_t = 0$ col of $\Delta x_{tu}$ ;
        $\Delta y_t = 0$ col of $\Delta y_{tu}$ ;
        $\Delta z_t = 0$ col of $\Delta z_{tu}$ ;

Set $\Delta^{0}x_t$, $\Delta^{0}y_t$, $\Delta^{0}z_t$ to 0;
        for $(t = 0; t \leq n; t$++){     "curve $f(*,u,v)$"
            if $(|\Delta^{0}x_t|$ is the largest){
                if $(\Delta^{0}x_t > n^3m^3l^3)${
                    UPDATE_POS$(X,1)$;
                    $\Delta^{0}x_t$ $-= 2n^3m^3l^3$; }
                else if $(\Delta^{0}x_t < -n^3m^3l^3)${
                    UPDATE_POS$(X,-1)$;
                    $\Delta^{0}x_t$ $+= 2n^3m^3l^3$; }
                $\Delta^{0}x_t$ $+= \Delta^{1}x_t$;
                $\Delta^{1}x_t$ $+= \Delta^{2}x_t$;
                $\Delta^{2}x_t$ $+= \Delta^{3}x_t$;
            }     "step only in $x$"
            else if $(|\Delta^{0}y_t|$ is the largest)
                Same decisions for $\Delta y_t$;
            else   Same decisions $\Delta z_t$;
            PUT_VOXEL ();
        }
    Update $\Delta x_{tu}$, $\Delta y_{tu}$, $\Delta z_{tu}$:     col 0 += col 1;
                                    col 1 += col 2;
                                    col 2 += col 3;

(Fig.12a continue on next page)

FIG. 12A(1)

(Continue from previous page)

```
        if (| Δ⁰⁰x_tu | is the largest){
            if (Δ⁰⁰x_tu > n³m³l³){ x_u ++;
                Δ⁰⁰x_tu -= 2n³m³l³; }
            else if (Δ⁰⁰x_tu < -n³m³l³){ x_u --;
                Δ⁰⁰x_tu += 2n³m³l³; }
        }                                           "step only in x"
        else if (| Δ⁰⁰y_tu | is the largest)
              Same decisions for Δy_tu;
        else  Same decisions for Δz_tu;
    }
    Update Δx_tuv, Δy_tvu, Δz_tuv : layer 0 += layer 1;
                                   layer 1 += layer 2;
                                   layer 2 += layer 3;
    if (| Δ⁰⁰⁰x_tuv | is the largest){
        if (Δ⁰⁰⁰x_tuv > n³m³l³){ x_v ++;
            Δ⁰⁰⁰x_tuv -= 2n³m³l³; }
        else if (Δ⁰⁰⁰x_tuv < -n³m³l³){ x_v --;
            Δ⁰⁰⁰x_tuv += 2n³m³l³; }
    }                                               "step only in x"
    else if (| Δ⁰⁰⁰y_tuv | is the largest)
          Same decisions for Δy_tuv;
    else  Same decisions for Δz_tuv;
}
```

FIG. 12A(2)

METHOD OF CONVERTING CONTINUOUS THREE-DIMENSIONAL GEOMETRICAL REPRESENTATIONS INTO DISCRETE THREE-DIMENSIONAL VOXEL-BASED REPRESENTATIONS WITHIN A THREE-DIMENSIONAL VOXEL-BASED SYSTEM

BACKGROUND OF THE INVENTION

The present invention relates generally to methods of converting continuous geometrical representations into discrete representations, and more particularly relates to methods of converting three-dimensional continuous geometrical representations into discrete three-dimensional voxel-based representations within a three-dimensional voxel-based system.

SETTING FOR THE INVENTION

Three-dimensional (hereinafter "3-D") computer graphic systems based upon voxel (i.e., volume element) representation of 3-D objects in a large 3-D memory, are known and have been described, for example, in the following publications:

"A 3-D Cellular Frame Buffer," Arie Kaufman and R. Bakalash, in *Proc. EUROGRAPHICS '85*, Nice, France, September 1985, pp. 215-220;

"Memory Organization for a Cubic Frame Buffer," Arie Kaufman, in *Proc. EUROGRAPHICS '86*. Lisbon, Portugal, August 1986, pp. 93-100;

"Towards a 3-D Graphics Workstation," Arie Kaufman, in *Advances in Graphics Hardware I*, W. Strasser (Ed.), Springer-Verlag, 1987, pp. 17-26;

"Voxel-Based Architectures for Three-Dimensional Graphics," Arie Kaufman, in *Proc. IFIP '86*, 10th World Computer Congress, Dublin, Ireland, September 1986, pp. 361-366;

"CUBE - An Architecture Based on a 3-D Voxel Map," Arie Kaufman and R. Bakalash, to appear in *Theoretical Foundations of Computer Graphics and CAD*, R. A. Earnshaw (Ed.), Springer-Verlag, 1988, pp. 689-701;

"Parallel Processing for 3D Voxel-Based Graphics," Arie Kaufman and R. Bakalash, to appear in *Parallel Processing for Computer Vision and Display*, P. M. Dew, R. A. Earnshaw, and T. R. Heywood (Eds.), Addison-Wesley, 1988;

"Memory and Processing Architecture for 3-D Voxel-Based Imagery," Arie Kaufman and R. Bakalash, in *IEEE Computer Graphics and Applications*, 1988; and "The CUBE Three-Dimensional Workstation," Arie Kaufman, in *Proc. NCGA '88*: Ninth Annual Conference and Exposition, Anaheim, Calif., March 1988, pp. 344-354.

As disclosed in the above publications and generally illustrated in FIGS. 1 and 2, the 3-D computer graphic workstation 1 is based upon 3-D voxel-based representation of objects within a large 3-D memory 2 referred to hereinafter as a 3-D Cubic Frame Buffer, which comprises specially organized memory modules (not shown) containing a cellular array of unit cubic cells called voxels. The workstation 1 is a multiprocessor system with three processors accessing the Cubic Frame Buffer 2 to input, manipulate, and view and render the 3-D voxel images.

In general, the processors include a 3-D Frame Buffer Processor 3, a 3-D Geometry Processor 4, and a 3-D Viewing Processor 5. The 3-D Frame Buffer Processor 3 acts as a channel for 3-D voxel-based images which have been "scanned" using a 3-D scanner 6 such as CAT and MRI medical scanners. The 3-D scanned voxel-based images are the primary source of Cubic Frame Buffer data. Once the voxel images are stored in the Cubic Frame Buffer 2, they can be manipulated and transformed by the 3-D Frame Buffer Processor 3, which also acts as a monitor for 3-D interaction.

The 3-D Geometry Processor 4 samples and thereafter converts or maps 3-D continuous geometric representations of a 3-D object, into their 3-D discrete voxel representation within the Cubic Frame Buffer 2. Notably, the 3-D continuous geometric representations comprise a set of mathematical functions which as a whole serve as a 3-D model of the 3-D object. Together, this sampling and conversion (i.e. mapping) process is typically referred to as a "scan-conversion" process.

The 3-D Viewing Processor 5 examines the voxels in the Cubic Frame Buffer 2 in a specified view direction which can be one of a variety of directions. By taking into consideration depth, translucency, and color values, the 3-D Viewing Processor 5 generates a 2-D shaded projection (i.e., video pixel image) of the cubic frame voxel-based image, inputs the same into a conventional 2-D frame buffer 7 which in turn is scanned by a conventional video processor 8, thereby updating a video screen 9 with the 2-D shaded pixel image.

Referring to FIG. 3, in particular, a general overview of 2-D and 3-D scan-conversion processes is given in terms of (i) mapping from continuous 3-D geometric models to 2-D discrete pixel-image space, and (ii) mapping from continuous 3-D geometric models to 3-D discrete voxel-image space, respectively. In the above-described 3-D voxel-based graphics system, the 2-D scan-conversion process illustrated in FIG. 3 is not carried out, as such prior art processes are strictly limited to 2-D image data-base generation and 2-D pixel-image modelling, whereas in contrast, the 3-D scan-conversion process provides robust 3-D image data-base generation and 3-D voxel-image modelling.

In order to obtain in real-time 2-D images projections of 3-D voxel images, a special common bus referred to as a Voxel-Multiple-Write-Bus (not shown) can be provided which simultaneously processes a full beam of voxels along a specified viewing direction and selects the first opaque voxel along the beam in a time which is proportional to the log of length of the beam of voxels. Also, in order to assist the special common bus in real-time viewing and to support real-time "3-D scan conversion" of continuous 3-D geometrical models into 3-D discrete voxel images, and manipulation of 3-D voxel-based images stored in the Cubic Frame Buffer, a special skewed 3-D memory organization can be provided which enables parallel retrieval and storage of whole beams of voxels. In addition to the unique memory organization of the Cubic Frame Buffer, a special addressing mechanism can be provided as well which works in connection with the special common bus and the 3-D skewed memory organization. Each of the above-mentioned system features are more fully described in the above-referenced publications.

The workstation described in the above publications provides a full range of inherent 3-D interactive operations in a simple yet general workbench set-up, since the workstation operates in both discrete 3-D voxel space and 3-D geometry space, and provides ways in which to interact the two spaces. Accordingly, the workstation can be used with inherent 3-D interaction devices, techniques and electronic tools, which support direct and natural interaction, generation, and editing of 3-D continuous geometrical models, 3-D discrete voxel images, and their transformations. Such a 3-D voxel-based graphics workstation is appropriate for many 3-D applications such as medical imaging, 3-D computer-aided design, 3-D animation and simulation (e.g. flight simulation), 3-D image processing and pattern recognition, quantitative microscopy, and general 3-D graphics interaction.

Thus, when using a 3-D voxel-based graphic system of the type described above and elsewhere in the literature, there arises the need for computationally efficient methods which convert 3-D continuous geometrical models of objects into 3-D discrete voxel-based representations, which can be, for example, stored in the 3-D Cubic Frame Buffer memory 2 of the voxel-based graphic system 1. Such computational processes are often referred to as methods of scan converting of 3-D objects, and are carried out in the 3-D Geometry Processor of the workstation described above. Scan conversion methods generate discrete voxel representations of 3-D objects, and provide computationally efficient ways in which to write voxel representations for such objects into the Cubic Frame Buffer of the workstation.

Typically, there are two principal approaches to writing into the Cubic Frame Buffer 2, 3-D discrete voxel representations of 3-D objects. In the case where a person desires to model in a voxel-based graphic system a real 3-D object (e.g. a teapot), 3-D digitizers (i.e. coordinate measuring devices) such as the 3Space Isotrack Stylus device can be used to measure and convert into the Cubic Frame Buffer, the coordinates of the real 3-D object, i.e., teapot. While this method is appropriate, it is often time-consuming and it ceases to be effective for large objects, e.g. an airplane, or objects in the design stage which do not yet exist.

An alternate approach to modeling 3-D objects involves using mathematical representations of various sorts to model the various elements of the objects, and subsequently to convert such 3-D continuous mathematical representations into 3-D discrete voxel representations which are to be stored in the 3-D Cubic Frame Buffer of the workstation. The types of mathematical representations presently available to model 3-D objects, either real or synthetic, include: 3-D lines, polygons (optionally filled), polyhedra (optionally filled), cubic parametric curves, bi-cubic parametric surface patches, circles (optionally filled) and quadratic objects (optionally filled) like those used in constructive solid geometry, such as cylinders, cones and spheres. Notably, the advantage of using 3-D continuous mathematical representations for modelling 3-D objects is that the objects can be either real, or synthetic, i e., having an existence only within the 3-D voxel-based computer graphics system itself.

It is appropriate at this juncture to discuss in general the nature of the 3-D scan-conversion process, and also the construction of 3-D voxel-based images of scan-converted 3-D continuous geometrical models of 3-D objects.

Referring to FIGS. 3 and 4 in particular, the scan-conversion process is illustrated as a mapping of a 3-D, geometrically-represented object in a continuous 3-D space, into a tesselated voxel-cellular model in discrete 3-D voxel-image space. Notably, most of the 3-D discrete topology terms used herein are generalizations of those used in 2-D discrete typology. Thus, referring to FIGS. 3 and 4, the continuous 3-D space $(R \times R \times R)$ is designated as "$R^3$ space", while the discrete 3-D voxel-image space $(Z \times Z \times Z)$, which is a 3-D array of grid points is hereinafter referred to as "$Z^3$ space". A voxel, or the region contained by a 3-D discrete point $(x, y, z)$ shall be termed the continuous region $(u, v, w)$ such that $x - 0.5 < u \leq x + 0.5$, $y - 0.5 < v \leq y + 0.5$, and $z - 0.5 < w \leq z + 0.5$.

This condition assumes that the voxel "occupies" a unit cube centered at the grid point $(x, y, z)$ and the array of voxels tesselates $Z^3$. Although there is a slight difference between a grid point and a voxel, they will be used interchangeably hereinafter.

As a child has a degree of flexibility regarding how he or she is to stack building blocks to construct a particular model of some object, the computer graphic designer using a voxel-based system as discussed above, similarly has a degree of flexibility in his or her voxel construction techniques. Thus, as a child learns that certain stacking arrangements of building blocks (for example, cubic building blocks) have structural and connectivity advantages over alternative stacking arrangements, so too does the computer graphics designer realize that certain voxel connections or stacking arrangements may be preferred over others under particular circumstances.

How contiguous or neighboring voxels are connected or arranged with respect to one another, is a very important concept in voxel-representation in general, and in 3-D scan-conversion processes, in particular. This concept of how neighboring voxels are connected, is referred to as "connectivity" and is important enough to merit further discussion hereinbelow.

Referring to FIGS. 5A through 5C and 6A through 6C, the three types of possible voxel connections among neighboring voxels are illustrated. Much like an apartment dweller has different types of neighbors situated in front, in back, along his sides and below him, each voxel $(x, y, z)$ in discrete 3-D voxel-image space $Z^3$ (in the Cubic Frame Buffer), can have three kinds of neighbors as well. These three types of neighboring voxels are defined below by the following definitions:

(1) A voxel can have 6 direct neighbors at positions: $(x+1, y, z)$, $(x-1, y, z)$, $(x, y+1, z)$, $(x, y-1, z)$, $(x, y, z+1)$, and $(x, y, z-1)$.

(2) A voxel has 12 indirect neighbors at positions: $(x+1, y+1, z)$, $(x-1, y+1, z)$, $(x+1, y-1, z)$, $(x-1, y-1, z)$, $(x+1, y, z+1)$, $(x-1, y, z+1)$, $(x+1, y, z-1)$, $(x-1, y, z-1)$, $(x, y+1, z+1)$, $(x, y-1, z+1)$, $(x, y+1, z-1)$, and $(x, y-1, z-1)$.

(3) A voxel has 8 remote neighbors at positions: $(x+1, y+1, z+1)$, $(x+1, y+1, z-1)$, $(x+1, y-1, z+1)$,
$(x+1, y-1, z-1)$, $(x-1, y+1, z+1)$, $(x-1, y+1, z-1)$,
$(x-1, y-1, z+1)$, and $(x-1, y-1, z-1)$.

Alternatively, the three kinds of neighboring voxels defined above, can be specified in terms whether a voxel shares a face, a side (i.e. edge) or a corner with a neighboring voxel, as illustrated in FIGS. 5A, 5B, and 5C, respectively.

In discrete 3-D voxel image space $Z^3$, the 6 direct neighbors are defined as 6-connected neighbors and are graphically illustrated in FIG. 6A. Both the 6 direct and 12 indirect neighbors are defined as 18-connected neighbors and are graphically illustrated in FIG. 6B. All three kinds of neighbors are defined as 26-connected neighbors and are illustrated in FIG. 6C.

Referring now to FIGS. 7A, 7B and 7C, in particular, the three principal types of paths of connected voxels in $Z^3$ space, are graphically illustrated. In FIG. 7A, a 6-connected path is defined as a sequence of voxels such that consecutive pairs are 6-neighbors. In FIG. 7B, an 18-connected path is defined as a sequence of 18-neighbor voxels, while as shown in FIG. 7C, a 26-connected path is defined as a sequence of 26-neighbor voxels. From the above-defined and described voxel path connections and arrangements, any type of discrete 3-D voxel-based model can be constructed in $Z^3$ space of the 3-D Cubic Frame Buffer 2. For example, FIGS. 8A and 8B provide two views of a three-dimensional teapot modelled in discrete 3-D voxel-image space $Z^3$. The discrete 3-D voxel-image is created by connecting cubic voxels according to "26-connectivity" as described hereinabove. Notably, FIG. 8B provides a 2-D side cross-sectional view of the 3-D voxel representation of the teapot shown in FIG. 8A, and illustrates the "26-connectivity" nature of the 3-D voxel-based image of 8A. When closely examined, FIG. 8B illustrates the face-to-face and side-to-side (i.e. edge-to-edge) and even corner-to-corner connections of neighboring voxels.

In summary, "connectivity" relates to how unit voxels are connected together to synthesize voxel-based image representations of continuous 3-D geometrical models. Also, the type of connectivity employed specifies the number of "options" that are available when stepping in the coordinate directions of discrete 3-D voxel space during 3-D scan-conversion processes.

Turning now to other 2-D geometrical objects of interest in $R^3$ space, namely parametric surfaces, polygons and hollowed polyhedra, another elementary concept arises concerning the nature of the connectivity of the resultant filled 3-D objects which are represented as a set of voxels with a 3-D Cubic Frame Buffer, in particular. The concept is defined as "tunnels" and concerns "thickness" of voxel-represented surface, and how easily it is penetratable using, for example voxel-based beams or rays. There are three principal types of tunnels which are defined below. A 6-connected tunnel is a patch of 6-connected transparent voxels through a surface. Such tunnels are actual holes in the voxel-based surface. Similarly, an 18-connected tunnel is defined as a path of 18-connected transparent voxels through the voxel-based surface. Surfaces with tunnels of this kind are "thicker" than those surfaces lacking 6-connected tunnels. Even "thicker" voxel-based surfaces can be formed by avoiding 26-connected tunnels which are paths of 26-connected transparent voxels through the surface.

In addition to connectivity requirements, 3-D scan-conversion processes are also required to satisfy fidelity and efficiency requirements. All three of these requirements are met by the 3-D scan-conversion methods of the present invention disclosed hereinafter.

The basic fidelity requirements in scan-converting an object from $R^3$ to $Z^3$ space, are that:
(1) The discrete points from which the region contained by them is entirely inside the continuous object, are in the scan-converted discrete object.
(2) The discrete points from which the region contained by them is entirely outside the continuous object, are not in the scan-converted discrete object.

Obviously, some discrete points will not belong to either of the above cases and more guidelines are necessary. Those are:
(3) If the object is a curve (i.e. 1-D object), then the converted object will need certain connectivity requirements. In this case, the converted end point will be in the converted object.
(4) If the object is a surface (i.e. 2-D object), then it must meet certain "lack of tunnels" connectivity requirements. In this case, the converted curved "edges" will be converted object.
(5) If the object is volume (i.e. 3-D object), then its "inside" will be converted according to requirement (1) above. Other points will be treated by a majority decision, i.e. the discrete point is decided in the object if more than half its region is in the continuous object.

For curves, 6-connectivity, 18-connectivity or 26-connectivity can be selected, depending on implementation needs or modelling requirements.

Regarding connectivity for surfaces and volumes, the following conditions are required. For surfaces, 6-connected tunnels, 18-connected tunnels or 26-connected tunnels are disallowed depending on implementation needs or modelling requirements. For solid volumes, 6-connectivity is usually required to avoid any internal cavities.

Having discussed the conventional terminology and basic requirements of scan conversion methods, it is now appropriate to turn to and discuss 3-D scan-conversion methods known in the prior art, and point out with particularity their shortcomings and drawbacks.

Conventional 3-D scan-conversion methods for voxel-based graphics systems are described in the paper "3D Scan-Conversion Algorithms for Voxel-Based Graphics," by Arie Kaufman and Eyal Shimony, published on pp. 45–76, in *Proc.* 1986 ACM Workshop on Interactive 3D Graphics, held in Chapel-Hill, N.C., on October 1986. In this publication, several different types of methods for scan-converting 3-D continuous geometric objects (i.e., representations), are described. The 3-D geometric objects discussed therein include 3-D lines, polygons (optionally filled), polyhedra (optionally filled), cubic parametric curves, bi-cubic parametric surface patches, circles (optionally filled), and quadratic objects (optionally filled) like those used in constructive solid geometry: cylinders, cones and spheres.

In general, prior art scan-conversion methods disclosed in "3D Scan-Conversion Algorithms for Voxel-Based Graphics", are (i) incremental in nature, (ii) perform scan-conversion with computational complexity which is in linear proportion to the number of voxels written into the Cubic Frame Buffer, and (iii) use only additions, subtractions, tests and simpler operations inside the inner computational process loops. In general, all of the prior art methods are characterized by non-symmetric computational processes within the inside loops, thereby requiring stepping only along the designated coordinate direction and thus place severe constraints on the type of connections and connectivity that can be formed in any particular voxel-image arrangement. In addition, there are numerous other shortcomings and drawbacks as to make such processes less than desirable in many applications, as will be described below.

In the publication "3D Scan-Conversion Algorithms for Voxel-Based Graphics," a method for scan-converting 3-D straight lines is disclosed. This method converts 3-D line segments into a discrete set of voxels having 26-connectivity in discrete 3-D voxel-image space, $Z^3$. While the method uses only integer arithmetic and only addition, substraction, shifting and testing operations, the decision loop for x, y and z coordinate directions is non-symmetric and thus only 26-connected lines in 3-D voxel space can be generated. Thus while the x, y and z coordinates for each voxel can be computed incrementally, this non-symmetric method is incapable of drawing 6- and 18-connected type lines in 3-D discrete voxel-space space $Z^3$.

The above-referenced paper "3D Scan-Conversion Algorithms for Voxel-Based Graphics" discloses a method of scan-converting 3-D parametric polynomial curves and surfaces into 26-connected curves and surfaces lacking 6-connected tunnels, respectively, in discrete 3-D voxel-image space $Z^3$. The method for scan-converting 3-D parametric polynomial curves suffers from numerous shortcomings and drawbacks. In particular, the method requires floating-point arithmetic, numerical rounding operations in the computational loops, and is strictly a computational-based process which is quite slow and computationally inefficient. Also, while this scan-conversion method is incremental in nature, the computational loops for the x, y and z coordinate directions are non-symmetric, and therefore the method is capable of only generating 26-connected curves, and not 6- and 18-connected type curves, in 3-D discrete voxel-space, $Z^3$.

The prior art method for scan-converting 3-D parametric polynomial surfaces suffers from significant shortcomings and drawbacks as well. In particular, the method requires floating-point arithmetic, numerical rounding operations, and is a strictly computational-based process, which is quite slow and computationally inefficient. Also, while being incremental, the method's non-symmetrical nature limits the method to drawing only voxel-based surfaces lacking only 6-connected tunnels in 3-D discrete voxel-image space, $Z^3$.

In view, therefore, of prior art scan-conversion methodologies, there is a great need for scan-conversion methods which avoid the use of floating-point arithmetic, numerical rounding or truncation operations, and "brute-force" type computational processes for determining the voxel coordinates in the x, y and z directions. In addition to scan-conversion methods which are fast, computationally efficient, and lend themselves to simplified hardware and software implementation, there is also a great need for 3-D scan-conversion methods which generate voxel-based representations with a wide variety of voxel connectivities.

Accordingly, it is a principal object of the present invention to provide a method of converting continuous 3-D geometrical representations, into discrete 3-D voxel-based representations in discrete 3-D voxel-image space. In particular, the method is most suitable for use with a 3-D Cubic Frame Buffer memory of a 3-D voxel-based graphics system. However, the method can be used in numerous other environments and applications including beam-casting, ray-tracing, flooding, Z-buffer processes in pixel-image space, and other operations known in the art.

It is a further object to provide a method of converting 3-D continuous geometrical representations into discrete 3-D voxel-based representations, wherein the method has decisional process loops of a symmetric nature which determine the x, y and z coordinates of voxels using very simple comparisons, updating, and coordinate stepping (i.e. increment, decrement, or no change) operations. As a result of the symmetry between the decisional process loops for x, y, z coordinates, one high-speed hardware realization can be used to implement the scan-conversion methods hereof.

Another object of the present invention is to provide a method of converting continuous 3-D geometrical representations into discrete 3-D voxel-based representations having a wide variety of voxel connectivities.

A further object of the present invention is to provide methods of converting continuous 3-D geometrical representations into discrete 3-D voxel-based representations, wherein the method is incremental in nature, uses all integer arithmetic (i.e. math), thereby eliminating the requirement of numerical rounding or truncation operations. Notably, the scan-conversion method of the present invention is principally a decision-based process rather than a computational-based process. Thus, the mathematical operations carried out in the inner decision process loops are reduced to only additions, subtractions, tests and simpler operations in contrast with brute force computational measures characteristic of prior art computational scan-conversion processes.

It is a further object of the present invention to provide a method of scan-conversion that performs scan-conversion with computational complexity which is linear and in some special cases even less than linear, with respect to the number of voxels written in the Cubic Frame Buffer of a 3-D voxel-based system.

It is an even further object of the present invention to provide a method of converting a continuous 3-D straight-line segment into a discrete set of n voxels connected together for storage in a 3-D Cubic Frame Buffer memory of a voxel-based computer graphic system.

A further object of the present invention is to provide a method of converting a continuous 3-D parametric polynomial curve segment into a discrete set of n voxels connected together for storage in a 3-D Cubic Frame Buffer memory of a voxel-based computer graphic system.

It is a further object of the present invention to provide a method of converting a continuous 3-D parametric polynomial surface patch into a discrete set of $n \times m$ voxels connected together for storage in a 3-D Cubic Frame Buffer memory of a voxel-based computer graphic system.

It is a further object of the present invention to provide a method of converting a continuous 3-D parametric polynomial volume unit into a discrete set of $n \times m \times l$ voxels connected together so as to lack tunnels.

Yet a further object of the present invention is to provide 3-D voxel-based representations in 3-D voxel space, where the representations have a variety of connectivities, lack of tunnels, and lack of cavities.

These and other objects of the present invention will be explained hereinafter, and will be more particularly delineated in the appended claims, and other objects of the present invention will hereinafter be apparent to one with ordinary skill in the art to which the present invention pertains.

SUMMARY OF THE INVENTION

In general, the present invention concerns a method of converting continuous 3-D geometrical representations in continuous 3-D geometrical space, into 3-D voxel-based representation in discrete 3-D voxel space. The continuous 3-D geometrical representation is transformed into an integer-based 3-D geometrical representation characterized by at least one integer parameter. The value of the integer is determined so that the voxels of the discrete set comprising the 3-D voxel-based representation, are connected. The x, y and z integer coordinate values of each voxel are then symmetrically determined by independently stepping along the x, y and z coordinate directions in discrete 3-D voxel space, and using substantially the same decisional process logic for each of the x, y and z coordinate directions.

One aspect of the present invention concerns a method of converting a continuous 3-D straight line segment into a discrete set of n voxels connected together in discrete 3-D voxel space of a voxel-based graphic system. The 3-D straight line segment is defined by two endpoints $P_1$ and $P_2$ each having integer coordinates and specifying the extents of x, y and z coordinate directions of the 3-D straight line segment. The discrete 3-D voxel space is characterized by orthogonal x, y and z coordinate directions, where the addresses of the discrete 3-D voxel space are specified by integer x, y and z coordinate values of the voxels.

The method comprises computing the value of integer n to determine the number of sample points sampled along the continuous 3-D straight line segment. Notably, integer n corresponds to the number of voxels in the discrete set. Integer voxel-coordinate error variables for the x, y and z coordinate directions are defined as well as are first and second error variable increments along each of the x, y and z coordinate directions. The initial values of the integer error variables are specified, and thereafter, the voxel having x, y and z coordinate values of the first endpoint $P_1$ of the sample 3-D line segment, is placed into the discrete 3-D voxel space. Then, the remaining voxels of the discrete set of voxels are then converted in the discrete 3-D voxel space.

In the preferred embodiment, conversion of the remaining voxels comprises carrying out in a symmetrical loop, for each subsequent voxel in the discrete set of voxels, the following steps. The integer coordinate values in the x, y and z directions which are closest to the corresponding sample point for the continuous 3-D line segment, are determined on the basis of the integer error voxel-coordinate variables and the first and second error variable increments for the x, y and z coordinate directions. The error voxel-coordinate variables for the x, y and z coordinate directions, are updated on the basis of respective first and second error variable increments. The voxel having the integer x, y and z coordinate values determined in the step above, is placed into the discrete 3-D voxel space. Thereafter in a loop fashion, the above steps are repeated for subsequent voxels of the discrete set of n voxels, until the integer coordinate values for the $n^{th}$ voxel is determined. By this process, the continuous 3-D straight line segment is converted into the discrete set of n voxels connected together in the discrete 3-D voxel space of the voxel-based graphic system.

In one embodiment of the present invention, the value of n is set to an integer value proportional in value to the maximum of the x, y and z extents and, the x, y and z integer coordinate values are determined by independently stepping along the x, y and/or z coordinate directions. This scan-conversion process generates 3-D voxel-based line segments having 26-connectivity.

In another embodiment of the present invention, the integer value n is set to an integer value proportional in magnitude to the sum of the x, y and z extents, and the x, y and z integer coordinate values are determined by stepping along only one of the x, y and z coordinate directions. This conversion process, on the other hand, generates 3-D voxel-based line segments having 6-connectivity.

In yet another embodiment of the present invention, the integer n is set to an integer value proportional in magnitude to the maximum of (1) the maximum of the x, y and z extents, and (2) the ceiling of one-half of the sum of the x, y and z extents, and the x, y and z coordinate values are determined by stepping along x and/or y, or x and/or y, z, or x and/or z coordinate directions. This process generates 3-D voxel-based line segments having 18-connectivity.

Another aspect of the present invention concerns a method of converting a continuous 3-D parametric polynomial curve segment into a discrete set of n voxels connected together in discrete 3-D voxel space of a voxel-based graphics system. The 3-D parametric curved segment has first and second endpoints and is defined by a $K^{th}$ order polynomial vector T, a geometric basis vector M, a geometric control point vector G, parameter t, and an integer step size along parameter t. The discrete 3-D voxel space is characterized by orthogonal x, y and z coordinate direction, where the addresses of the discrete 3-D voxel space are specified by integer x, y and z coordinate values of the voxels.

The method of the present invention comprises computing the value of integer n in order to determine the number of sample points sampled along the parameter t of the continuous 3-D parametric polynomial curve segment. Notably, the integer n is determined so that consecutive voxels of the discrete set of n voxels are connected. A $K^{th}$ order integer Finite Forward Difference (FFD) matrix is defined for the 3-D parametric polynomial curve segment, for which the parameter t takes on integer values from 0 to n. Thereafter, an initial $K^{th}$ order FFD vector is determined for the 3-D parametric polynomial curve segment, on the basis of the $K^{th}$ order FFD matrix, the geometric basis matrix M and the geometric control point vector G.

The method involves supplying integer decision variables for the x, y and z coordinate directions, first and second decision thresholds based on n and a decision variable increment based on n, as well. An initial value is specified for each integer decision variable defined above. The voxel having x, y and z coordinate values corresponding to the first endpoints of the 3-D parametric polynomial curve segment, is placed into the discrete 3-D voxel space. Thereafter, the 3-D continuous parametric polynomial curve segment is converted into the discrete set of n voxels, based on the integer decision variables, the first and second thresholds, the decision variable increment, and the first endpoint.

In the preferred embodiment, the conversion step comprises performing, for each integer value of the parameter t from 0 to n, the following operations. The integer coordinate values in the x, y and z coordinate directions which are closest to the corresponding sample point of the 3-D parametric polynomial curve segment, are determined on the basis of the integer decision variables defined above and the first and second decision thresholds. The integer decision variables are updated using the decision variable increment and also the FFD vector is updated as well. Thereafter the voxel having the integer x, y and z coordinate values determined above, are placed into the discrete 3-D voxel space. For the subsequent voxels of the discrete set of n voxels, the above steps are repeated in a loop fashion until the integer coordinate values for the n-th voxel are determined, whereby the 3-D parametric polynomial curve segment is converted into the discrete set of n voxels connected together in the discrete 3-D voxel space of the voxel-based graphic system.

Another aspect of the present invention concerns a method of converting a continuous 3-D parametric polynomial surface patch into a discrete set of n×m voxels connected together in discrete 3-D voxel space of a voxel-based graphic system. The 3-D parametric polynomial surface patch is defined by bi-$K^{th}$ order polynomial vectors T and U, a geometric basis M, a geometric control point matrix G, and parameters t and u each with an integer step size. The 3-D parametric polynomial surface patch is formed by a plurality of 3-D parametric polynomial curve segments each having first and second endpoints. The discrete 3-D voxel space is characterized by orthogonal x, y and z coordinate directions, where the addresses of the discrete 3-D voxel space is specified by integer x, y and z coordinate values of the voxels.

The method of the present invention comprises computing the values of n and m to determine the number of sample points sampled along the parameters t and u, respectively, of the continuous 3-D parametric polynomial surface patch. The integers n and m are determined so that a resulting set of n×m voxels lack tunnels. The method involves defining first and second bi-$K^{th}$ order integer FFD matrices for the 3-D parametric polynomial surface patch. The first bi-$K^{th}$ order FFD matrix corresponds to the parameter t which takes on integer values from 0 to n, and the second bi-$K^{th}$ order FFD matrix corresponds to the parameter u which takes on integer values from 0 to m.

An initial bi-$K^{th}$ order FFD matrix is determined for the 3-D parametric polynomial surface patch, on the basis of the first and second bi-$K^{th}$ order FFD matrices, the geometric basis matrix M, and the geometric control point matrix G. The method involves defining surface integer decision variables for the x, y and z coordinate directions, as well as first and second decision threshold based on n and m, and the decision variable increment based on n and m. An initial value is specified for each surface integer decision variable defined above. Thereafter the 3-D parametric polynomial surface patch is converted into the discrete set of n×m voxels, with the conversion occurring on the basis of the integer decision variables, the first and second thresholds, the decision variable increment and the first endpoint.

In the preferred embodiment, the conversion step of the method comprises performing for each integer value of u from 0 to m, the following steps. A voxel corresponding with the first endpoint of the u-th 3-D parametric polynomial curve segment, is placed into the discrete 3-D voxel space. An initial $K^{th}$ order FFD-vector is formed for the u-th 3-D parametric polynomial curve segment on the basis of the initial bi-$K^{th}$ order FFD matrix for the 3-D parametric polynomial surface patch. Curve integer decision variables are defined for the x, y and z coordinate directions for the u-th 3-D parametric polynomial curve segment. An initial value is specified for each curve integer decision variable. Thereafter the u-th 3-D parametric polynomial curve segment is converted into the discrete set of voxels. The FFD matrix is updated. Thereafter, the integer coordinate values in the x, y and z coordinate directions which are closest to the first endpoint of the $(u+1)^{st}$ 3-D parametric polynomial curve segment, is determined on the basis of the surface integer decision variables defined above and the first and second decision thresholds. Subsequently, the surface integer decision variables are updated using the integer decision variable increment.

In the preferred embodiment, the curve segment conversion step comprises performing for each integer value of the parameter t from 0 to n, the following operations. The integer coordinate values in the x, y and z coordinate directions which are closest to the corresponding sample points of the u-th 3-D parametric polynomial curve segment, is determined on the basis of the curve integer decision variables and the first and second decision thresholds. The curve integer decision variables are then updated using the decision variable increment. Also, the FFD vector for the u-th 3-D parametric polynomial curve segment formed above, is updated. The voxel having the integer x, y and z coordinate values determined in the above step, is placed into the discrete 3-D voxel space. Thereafter, for the subsequent voxels of the discrete set of n voxels, the above steps are repeated in a loop fashion until the integer coordinate values of the n-th voxel are determined.

An even further aspect of the present invention concerns a method of converting a continuous 3-D parametric polynomial volume element into a discrete set of n×m×l voxels connected together in discrete 3-D voxel space of a voxel-based graphic system. The 3-D parametric polynomial volume element is defined by tri-$K^{th}$ order polynomial vectors T, U and V, a geometric basis M, a geometric control point tensor G and parameters t, u, and v each with an integer step size. The 3-D parametric polynomial volume element is formed by a plurality of 3-D parametric polynomial surface patches each of which is formed by a plurality of 3-D parametric polynomial curve segments each having first and second endpoints. The discrete 3-D voxel space is characterized by orthogonal x, y and z coordinate directions, where the addresses of the discrete 3-D voxel space are specified by integer x, y and z coordinate values of the voxels.

The method of the present invention comprises computing the values of integers n, m and l to determine the number of sample points sampled along the parameters t, u and v, respectively, of the parametric polynomial volume element. Notably, integers n, m and l are determined so that a resulting set of n×m×l voxels lack cavities. The method involves defining first, second and third tri-$K^{th}$ order integer FFD matrices for the 3-D parametric polynomial volume element. The first tri-$K^{th}$ order FFD matrix corresponds to the parameter t which takes on integer values from 0 to n, the second tri-$K^{th}$ order FFD matrix corresponds to the parameter u which takes on integer values from 0 to m, and the third tri-$K^{th}$ order FFD matrix corresponds to the parameter v which takes on integer values from 0 to l. Next, an initial tri-$K^{th}$ order FFD tensor is determined for the 3-D parametric polynomial volume element, on the basis of the first, second and third tri-$K^{th}$ order FFD matrices, the geometric basis M and the geometric control point tensor G.

The method involves defining volume integer decision variables for the x, y and z coordinate directions, first and second decision threshold based on n, m and l, and a decision variable increment based on n, m and l. An initial value is specified for each integer decision variable defined above. Thereafter, the continuous 3-D parametric polynomial volume element is converted into the discrete set of n×m×l voxels, based on the integer decision variables, the first and second decision thresholds, the decision variable increment, and the first endpoint.

In the preferred embodiment, the step of converting the 3-D parametric polynomial volume element into the discrete set of n×m×l voxels, comprises performing for each integer value v from 0 to l, the following operations. A v-th continuous 3-D parametric surface patch is converted by holding constant the parameter v and varying parameter u from 0 to m and varying parameter t from 0 to n. In a loop fashion, the following steps are performed. An initial $K^{th}$ order FFD matrix is formed for the v-th 3-D parametric polynomial surface patch on the basis of the tri-$K^{th}$ order FFD tensor for the 3-D parametric polynomial volume element. For the v-th 3-D parametric polynomial surface patch, surface integer decision variables are defined for the x, y and z coordinate directions. An initial value is specified for each surface decision variable. The v-th 3-D parametric polynomial surface patch is converted into a discrete set of n×m voxels. Thereafter, the FFD tensor is updated. The integer coordinate values in the x, y and z coordinate directions which are closest to the first endpoint of the $(u=0)^{th}$ 3-D parametric polynomial curve segment of the $(v+1)^{st}$ 3-D parametric polynomial surface patch, is determined on the basis of the volume integer decision variables defined above and the first and second decision thresholds.

In the preferred embodiment, the method of converting the v-th 3-D parametric polynomial surface patch into a discrete set of n×m voxels comprises performing for each integer value u from 0 to m, the following operations.

The voxel corresponding with the endpoint of the u-th 3-D parametric polynomial curve segment of the v-th 3-D parametric polynomial patch, is placed into the discrete 3-D voxel space. An initial $K^{th}$ order FFD vector is formed for the u-th 3-D parametric polynomial curve segment of the v-th 3-D parametric polynomial surface patch, on the basis of the $K^{th}$ order FFD matrix for the v-th 3-D parametric polynomial surface patch. For the u-th 3-D parametric polynomial curve segment, curve integer decision variables are defined for the x, y and z coordinate directions. An initial value is specified for each of the u-th curve integer decision variables. Thereafter, the u-th 3-D parametric polynomial curve segment is converted into the discrete set of n voxels. The FFD matrix for the v-th 3-D parametric polynomial surface patch is updated. Subsequently, the integer coordinate values in the x, y and z coordinate directions which are closest to the first endpoint of the $(u+1)^{st}$ 3-D parametric polynomial curve segment, is determined on the basis of the surface integer decision variables defined above and the first and second decision thresholds.

In the preferred embodiment, the conversion of the u-th 3-D parametric polynomial curve segment into the discrete set of n voxels comprises performing for each integer value for parameter t from 0 to n, the following operations. The integer coordinate values in the x, y and z coordinate directions which are closest to the corresponding sample point of the u-th 3-D parametric polynomial curve segment, is determined on the basis of the curve integer decision variables and the first and second decision threshold. The curve integer decision variables are updated using the decision variable increment. The FFD vector for the u-th 3-D parametric polynomial curve segment is updated. Then, the voxel having the integer x, y and z coordinate values determined in the step above, is placed into the discrete 3-D voxel space. For the subsequent voxels, the discrete set of n voxels, the above steps are repeated in loop fashion until the integer coordinate values for the n-th voxel are determined.

As a result of the present invention, continuous 3-D geometrical representations of a wide variety of forms, can be scan-converted into discrete 3-D voxel-based representations having a variety of connectivities, lack of tunnels, and lack of cavities, while utilizing all integer arithmetic and symmetrical (i.e. logically identical) decisional process loop for the x, y and z coordinate directions.

BRIEF DESCRIPTION OF THE DRAWINGS

For a full understanding of the objects of the present invention, reference is made to the following detailed description of the preferred embodiment which is to be taken in connection with the accompanying drawings, wherein:

FIG. 9B is a computer program implementation of a symmetrical method for scan-converting 26-connected 3-D lines according to the principles of the present invention;

FIG. 9D is a computer program implementation of a symmetrical method for scan-converting 3-D 18-connected line segments, according to the principles of the present invention;

FIG. 9E is a computer program implementation of a symmetrical method for scan-converting 3-D 6-connected line segments, according to the principles of the present invention;

FIG. 10A is a computer program implementation of a symmetrical method for 3-D scan conversion of 3-D parametric polynomial curve segments, according to the principles of the present invention;

FIG. 11A is a computer program implementation of a symmetrical method for 3-D scan-conversion of continuous 3-D parametric polynomial surface patches, according to the principles of the present invention;

FIG. 12 is a computer program implementation of a symmetrical method for 3-D scan-conversion of continuous 3-D parametric polynomial volume elements, according to the principles of the present invention.

DETAILED DESCRIPTION OF THE PREFERRED EMBODIMENTS OF THE PRESENT INVENTION

Figure 1:
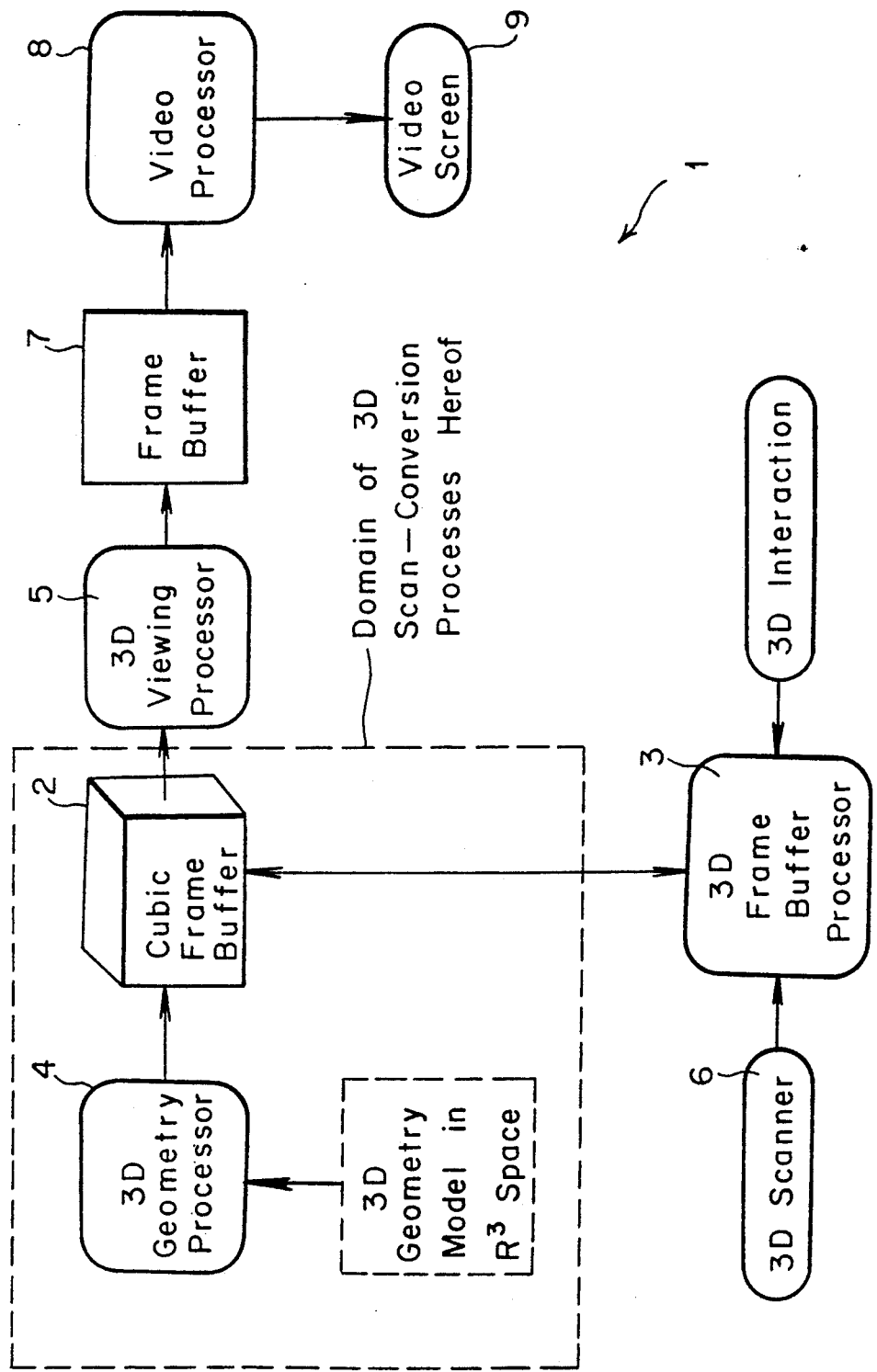
FIG. 1 is a block diagram of a 3-D voxel-based graphics workstation on which the 3-D scan-conversion methods of the present invention can be carried out.
Figure 2:
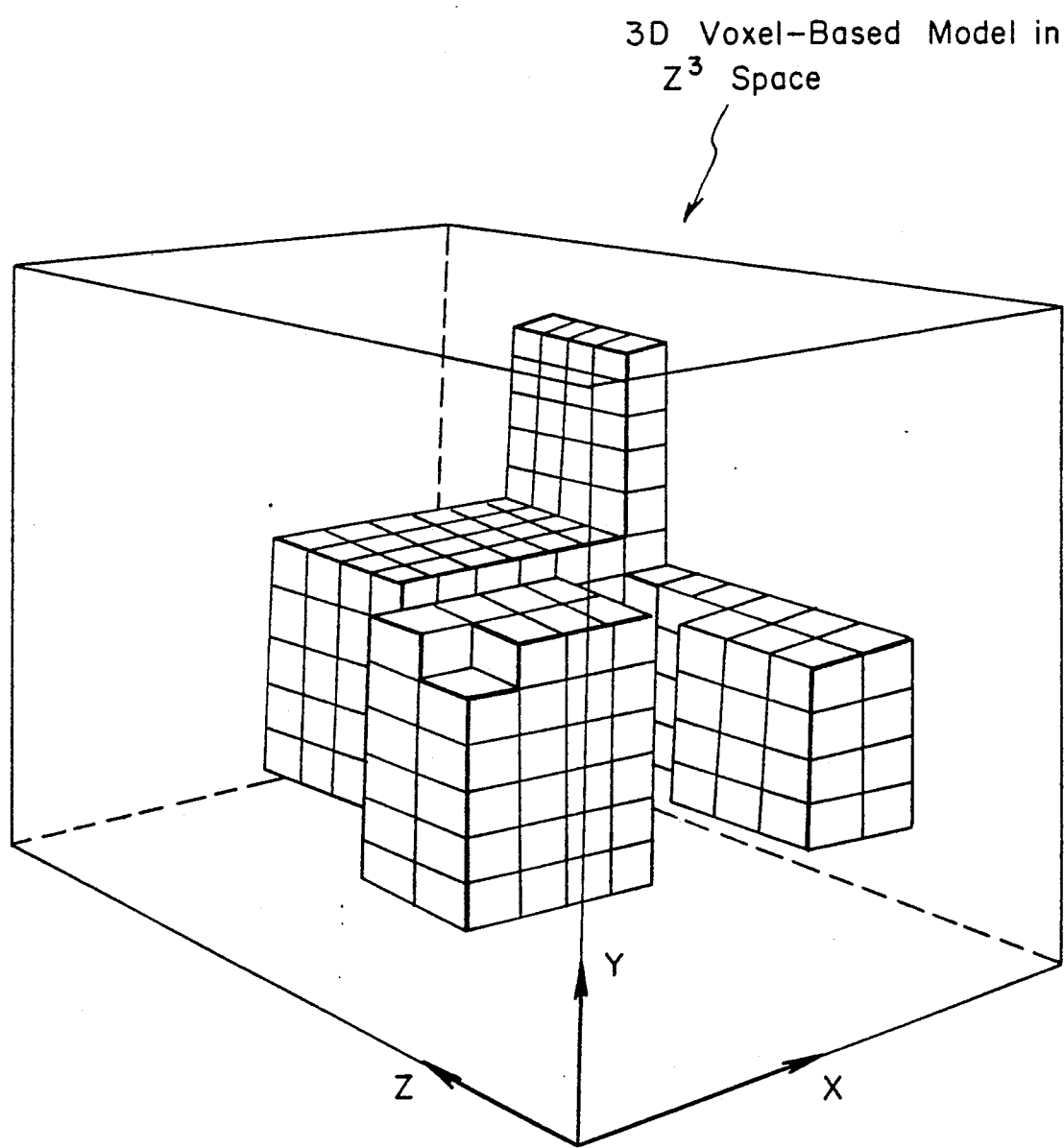
FIG. 2 is a schematic diagram of a 3-D cellular array model of the 3-D Cubic Frame Buffer of the voxel-based graphics system of FIG. 1.
Figure 3:
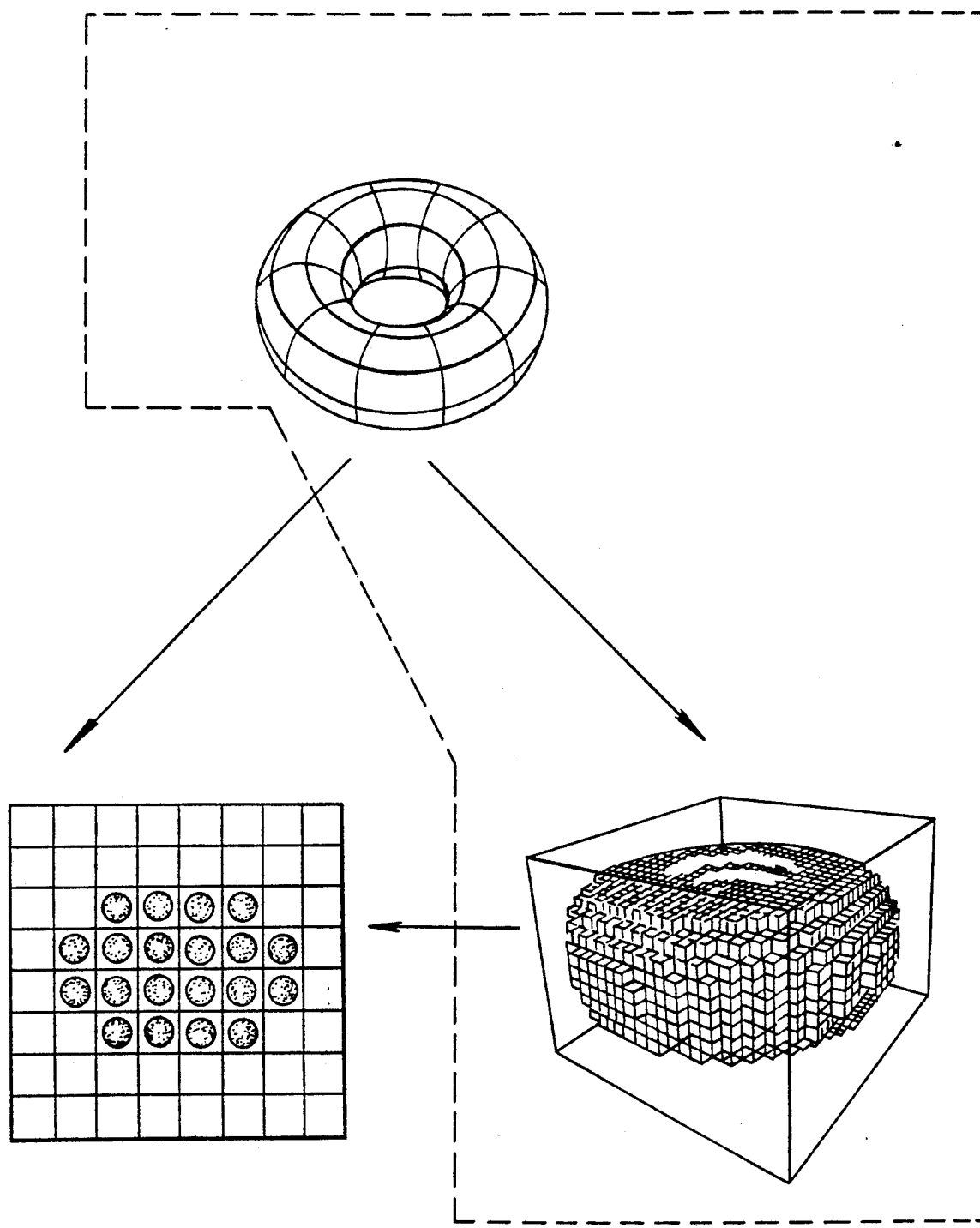
FIG. 3 is a schematic diagram illustrating 2-D and 3-D scan-conversion processes and their relationship with discrete 2-D pixel-image space and discrete 3-D voxel-image space, respectively.
Figure 4A:
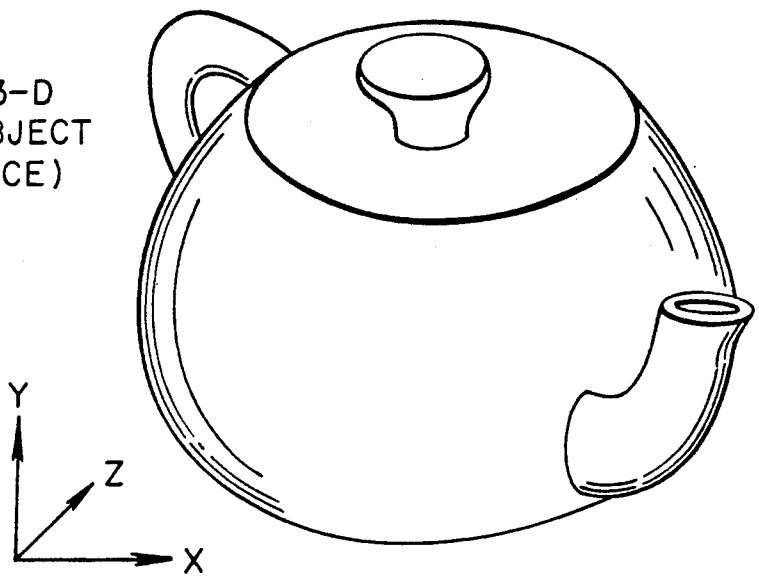
FIG. 4 is a schematic diagram illustrating the scan-conversion of a continuous 3-D object represented in continuous 3-D geometrical object space $R^3$, into a discrete 3-D voxel-based representation in discrete 3-D voxel-image space $Z^3$, according to the principles of the present invention.
Figure 4B:
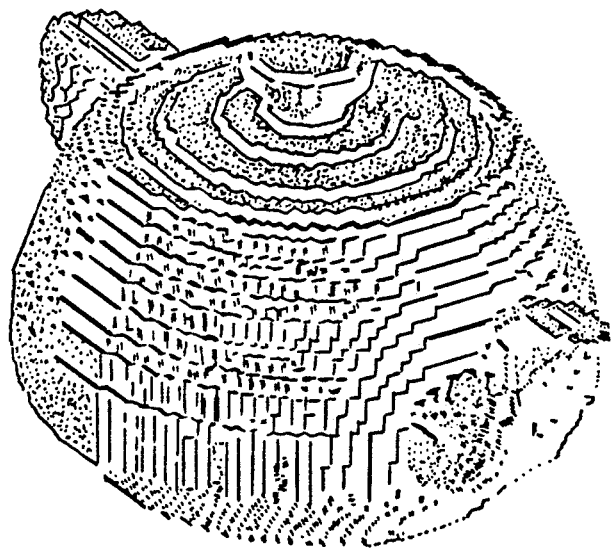
Figure 5A:
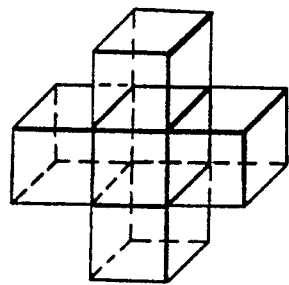
FIG. 5A is a graphical representation of neighboring voxels that share a face.
Figure 5B:
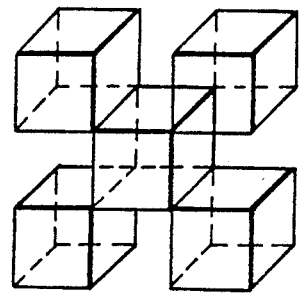
FIG. 5B is a graphical representation of voxels that share a side.
Figure 6A:
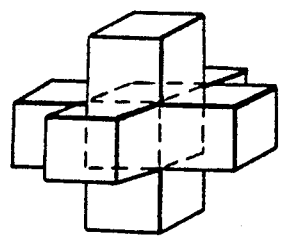
FIG. 6A is a graphical representation of an arrangement of neighboring voxels according to the definition of 6-connected neighbors.
Figure 5C:
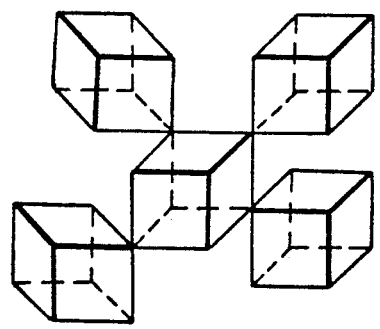
FIG. 5C is a graphical representation of voxels that share a corner.
Figure 6C:
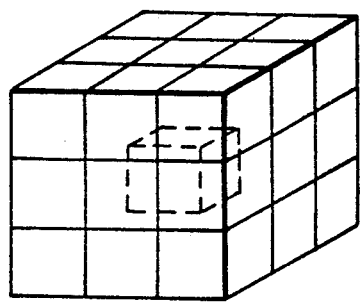
FIG. 6C is a graphical representation of neighboring voxels arranged according to the definition of 26-connected neighbors.
Figure 6B:
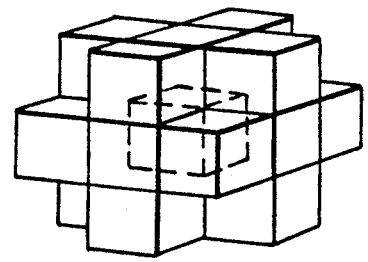
FIG. 6B is a graphical representation of neighboring voxels arranged according to the definition of 18-connected neighbors.
Figure 7A:
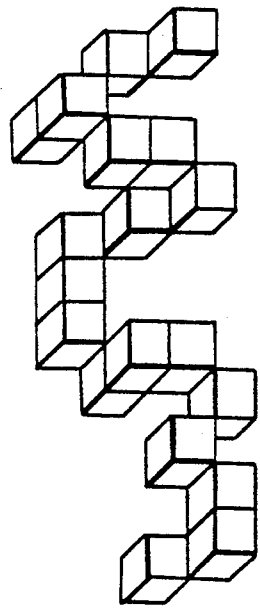
FIG. 7A is a graphical representation of a sequence of voxels arranged in a 6-connected path.
Figure 7B:
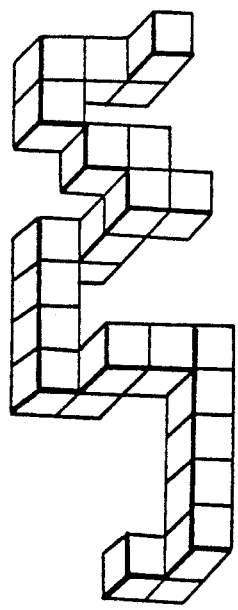
FIG. 7B is a graphical representation of voxels arranged in an 18-connected path.
Figure 7C:
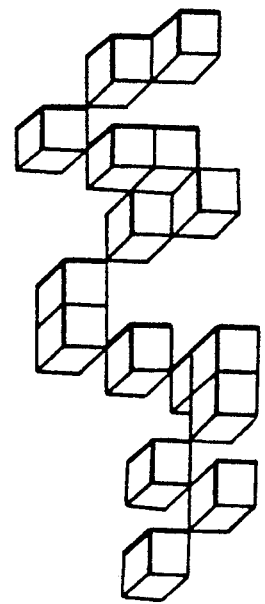
FIG. 7C is a graphical representation of a sequence of voxels arranged in a 26-connected path.
Figure 8A:
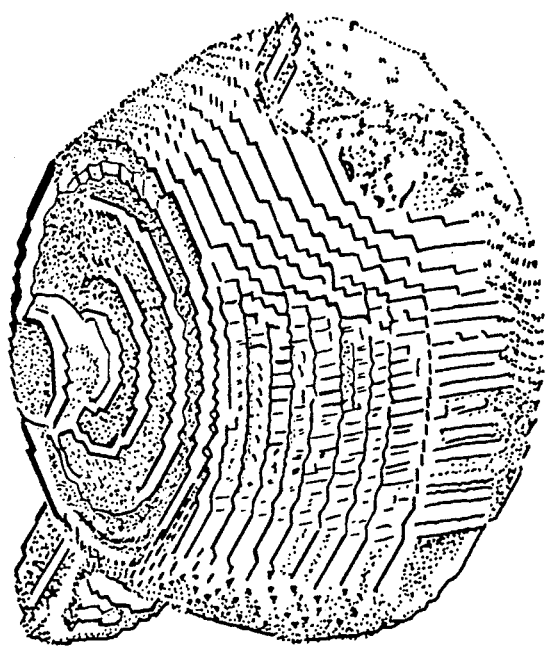
FIG. 8A is a graphical representation of a hollow 3-D voxel-based teapot represented in $Z^3$ space.
Figure 8B:
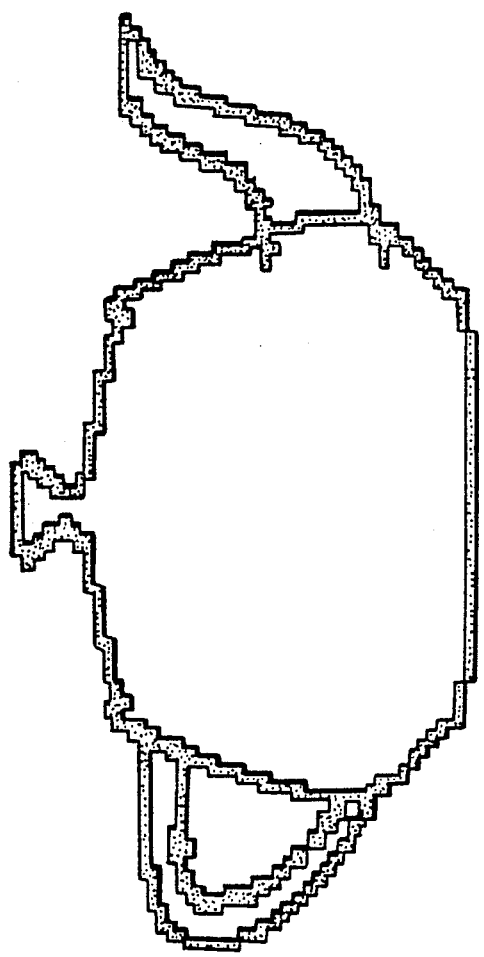
FIG. 8B is a side cross-sectional view of the 3-D voxel-based teapot of FIG. 8A.
Figure 9C:
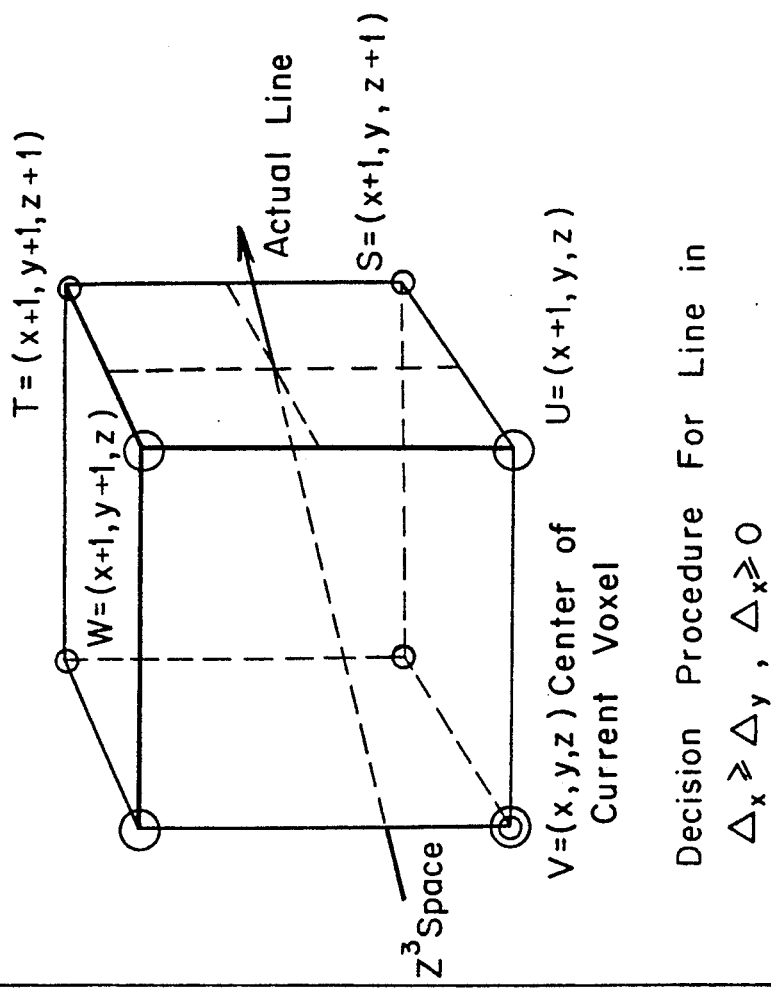
FIG. 9C is a schematic representation of the coordinate directions of a voxel in discrete 3-D voxel-image space which is used in incrementally scan-converting 3-D line segments according to the principles of the present invention.
Figure 9A:
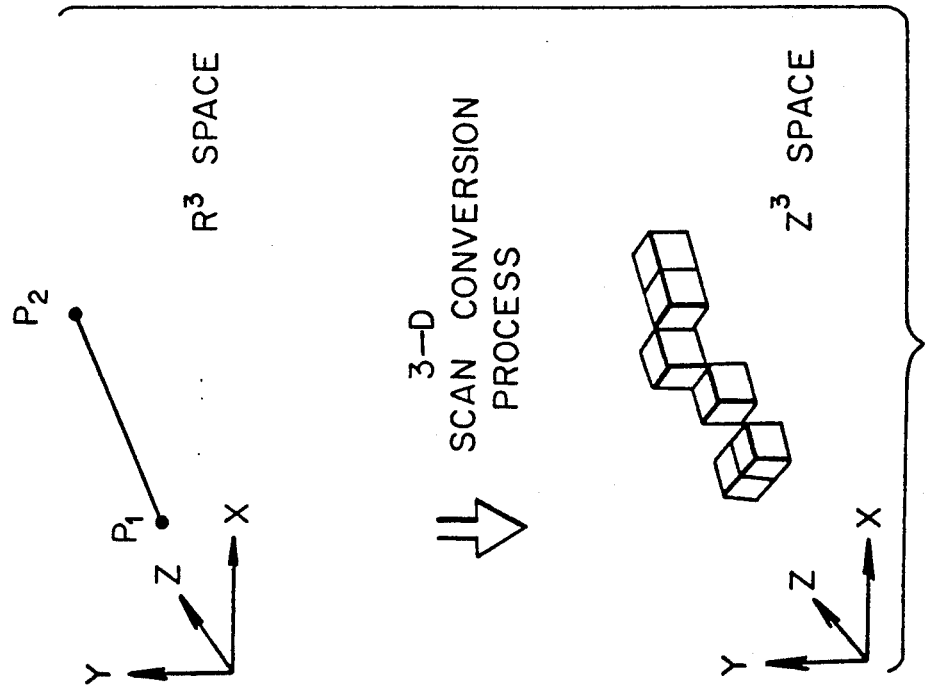
FIG. 9A is a schematic representation of 3-D scan-conversion of a straight line segment represented in continuous 3-D geometric-object space, into a 3-D voxel-based representation in discrete 3-D voxel-image space.

Referring to FIGS. 9A, 9B and 9C in particular, the method of scan-converting a continuous 3-D straight line segment with positive x, y and z extents, into a discrete set of n voxels connected together with 26-connectivity, will now be described.

In FIG. 9A, a 3-D straight line segment 1 is defined by two end points $P_1$ and $P_2$ within a 3-D continuous Cartesian (i.e. x, y and z) coordinate system, where the end points $P_1$ and $P_2$ have integer coordinates, $P_1 = (x_1, y_1, z_1)$ and $P_2 = (x_2, y_2, z_2)$. The goal of the scan-conversion method of the present invention, is to determine the set of n voxel coordinates (x, y, z) within the 3-D discrete voxel-image space coordinate system, $Z^3$, that most closely approximates the continuous 3-D line segment defined in the 3-D continuous Cartesian coordinate system, $R^3$, and with different types of voxel connectivities. Notably, this function is carried out incrementally using (i) only integer arithmetic and (ii) symmetrical decisional process loops for determining the x, y, and z coordinates of each voxel.

The first stage of the scan-conversion method involves computing the value of integer n, in order to determine the number of sample points to be sampled along the continuous 3-D straight line segment. Notably, the integer n corresponds to the number of voxels in the discrete set of n voxels in 3-D discrete voxel-image space $Z^3$. Also, integer n corresponds to the number of "decisional process loops" to be carried out in the present method, i.e. one loop being executed for each set of voxel coordinate values $(x_1, y_1, z_1)$, for i=0, 1, ... n.

Depending on the type of "voxel connectivity" desired or required in the voxel-based model of the 3-D straight line segment, (i.e. 6-connectivity, 18-connectivity, or 26-connectivity), integer n will take on a different integer value for a particular 3-D continuous straight line segment. For the case of 26-connected lines, n, the estimate for the length (in voxels) of the line, is given by: $n = \text{MAX}(\Delta x, \Delta y, \Delta z)$ where $\Delta x = x_2 - x_1$; $\Delta y = y_2 - y_1$; $\Delta z = z_2 - z_1$; $P_2 = x_2, y_2, z_2$; $P_1 = x_1, y_1, z_1$; and $\Delta x, \Delta y, \Delta z \geq 0$. The number of voxels in the line segment is exactly $\text{MAX}(\Delta x, \Delta y, \Delta z) + 1$, including the starting point voxel.

The next stage of the scan-conversion method involves definition and initialization of the parameters and variables of the process. This step involves defining integer voxel-coordinate error (i.e. decision) variables $e_x$, $e_y$, and $e_z$ for x, y and z coordinate directions, respectively, and first and second error variable increments, $d1_x$, $d2_x$; $d1_y$, $d2_y$; and $d1_z$, $d2_z$ along each of the x, y and z coordinate directions.

In the preferred embodiment for the 3-D line segment in $Z^3$ space, the integer voxel-coordinate error variables $e_x$, $e_y$ and $e_z$ and first and second error variable increments along each x, y and z coordinate directions are given as:

$e_x = 2^*\Delta x - n;$ $d1_x = 2^*\Delta x;$ $d2_x = 2^*(\Delta X - n);$ $e_y = 2^*\Delta y - n;$ $d1_y = 2^*\Delta y;$ $d2_y2 = 2^*(\Delta y - n);$ $e_z = 2^*\Delta z - n;$ $d1_z = 2^*\Delta z;$ $d2_z = 2^*(\Delta z - n);$ Notably, the above set of parameter definitions are given in a preferred form, to simplify the decisional process loop and operations therein for determining x, y and z coordinates for the voxels. However, these parameter definitions can take on other forms without departing from the invention.

Next, the first end point $P_1 = x, y,$ and $z$, is then written into the 3-D Cubic Frame Buffer and represents the coordinate values of the first voxel $V_{i=1}$ in $Z^3$ space.

Entering the decisional process loop, the integer coordinate values $x_i, y_i, z_i$ for each voxel $V_i$ are determined so that such integer coordinates are closest to a corresponding sample point of the 3-D line segment in $R^3$ space. This process is carried out for each $x_i, y_i$ and $z_i$ integer coordinate value $i = 1, 2, \ldots, n$, as follows.

For each x, y or z coordinate direction, a simple decision process is performed to determine whether or not to either increment the respective coordinate direction. For example, if $e_x$ is greater than or equal to the decision threshold zero, then x is incremented by integer value "1" and $e_x$ is incremented by second error (i.e. decision) variable increment $d2_x$, but if $e_x$ is less than the decision threshold, then x is not changed in value and $e_x$ is updated by the first error variable increment $d1_x$. Similarly and independently, the above described decision process is carried out for y and z coordinate directions. Notably, since the same type decision process is executed for each x, y and z coordinate direction, the coordinate direction decision process is "symmetric in x, y, and z coordinate directions."

After determining the $x_i, y_i,$ and $z_i$ integer coordinate values, these values are used as the coordinate values of the corresponding voxel written into the 3-D Cubic Frame Buffer. The above process is then repeated for n times to generate the set of x, y and z coordinate values for the discrete set of n voxels connected together with "26-connectivity".

Since the decision process for the three x, y and z coordinates are carried out independently, for the "26-connectivity" case, one, two and/or three coordinates may be simultaneously changed at any step, i.e. for each voxel. In contrast, in the "6-connectivity" case, at most, one coordinate value may change at any step, i.e. for any voxel, and for the "18-connectivity" case, at most two coordinate values change at any step in the scan-conversion process of the present invention.

For the "6-connectivity" and "18-connectivity" type 3-D line segments in $Z^3$ space, similar processes as described above are performed, with however, several modifications described below.

Referring now to FIG. 9E, the method of scan-converting into a 6-connected 3-D line segment is illustrated, where n is computed by $$n = \Delta x + \Delta y + \Delta z$$

where $\Delta x, \Delta y,$ and $\Delta z \geq 0$.

Also, the decision parameter definitions are the same. However, the decision logic in the decisional process loop is different. In particular, the decision logic seeks to determine the largest integer voxel-coordinate error variable $e_x, e_y,$ or $e_z$, and increment coordinate value only along the corresponding coordinate direction. For example, if $e_x$ is greater than or equal to both $e_y$ and $e_z$, then x is incremented by an integer value 1, and $e_x$ is incremented by the second error variable increment $d2_x$, and both $e_y$ and $e_z$ are incremented by the corresponding first error variable increments $d1_y$ and $d1_z$, respectively, while coordinates y and z are unchanged.

Referring now to FIG. 9D, the method of scan-converting into an 18-connected 3-D line segment is illustrated, where n is computed by $$n = MAX[MAX(\Delta x, \Delta y, \Delta z), CEILING \ [(\Delta x + \Delta y + \Delta z)/2]],$$

where $\Delta x, \Delta y$ and $\Delta z \geq 0$, and where 37 CEILING" represents selecting the smallest integer which is larger than the argument of CEILING function.

Also, the definitions of the decision parameters remain the same as in both the 26 and 6 connectivity cases. However, the decision logic in the decisional process loop is different. In particular, the decision logic seeks to determine the two largest voxel coordinate error (i.e. decision) variables, and then decides whether or not to increment the corresponding coordinate values. For example, if $e_y$ and $e_z$ are the largest voxel-coordinate error variables, then x is not incremented, $e_x$ is updated by the first error variable increment $d1_x$, and two independent decision procedures for coordinate directions y and z are carried out. For example, if $e_y$ is greater than or equal to the decision threshold zero, then y is incremented by integer value "1", and $e_y$ is incremented by the second error variable increment $d2_y$; but if $e_y$ is less than zero, then y is unchanged (i.e. not incremented) and $e_y$ is incremented by the first error variable increment $d1_y$.

The above method has been implemented and shown in FIG. 9B in pseudo-C programming code.

Figure 10:
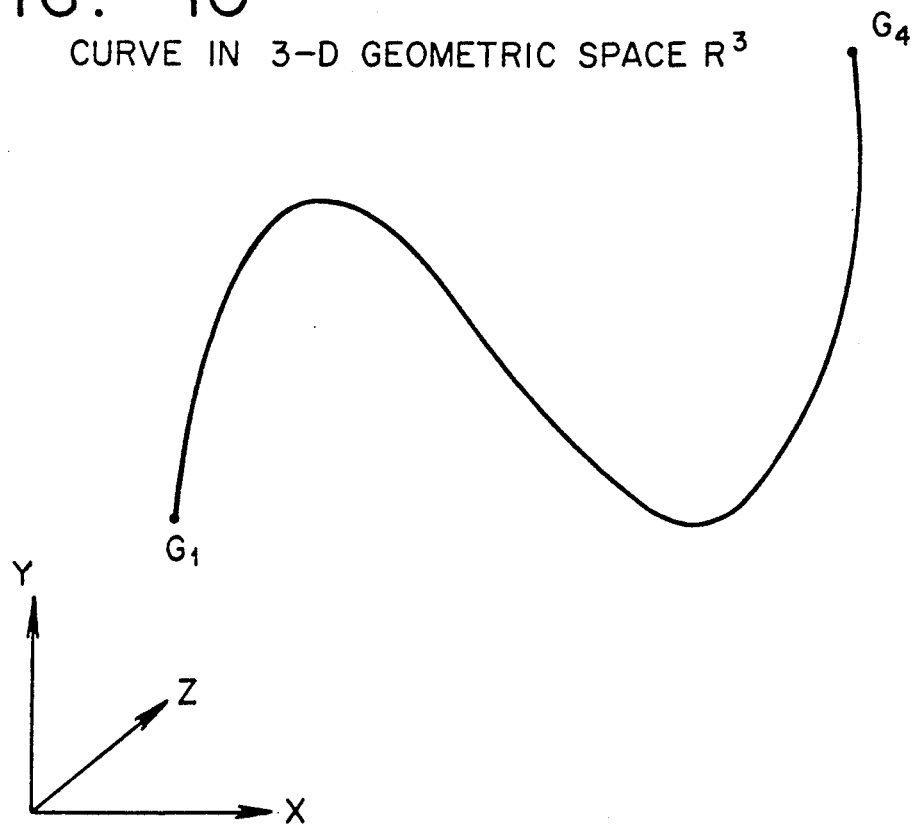
FIG. 10 is a schematic representation of 3-D scan-conversion of a 3-D curve segment represented in continuous 3-D geometric space, into a 3-D voxel-based representation in discrete 3-D voxel-image space, according to the principles of the present invention.
Figure 10:
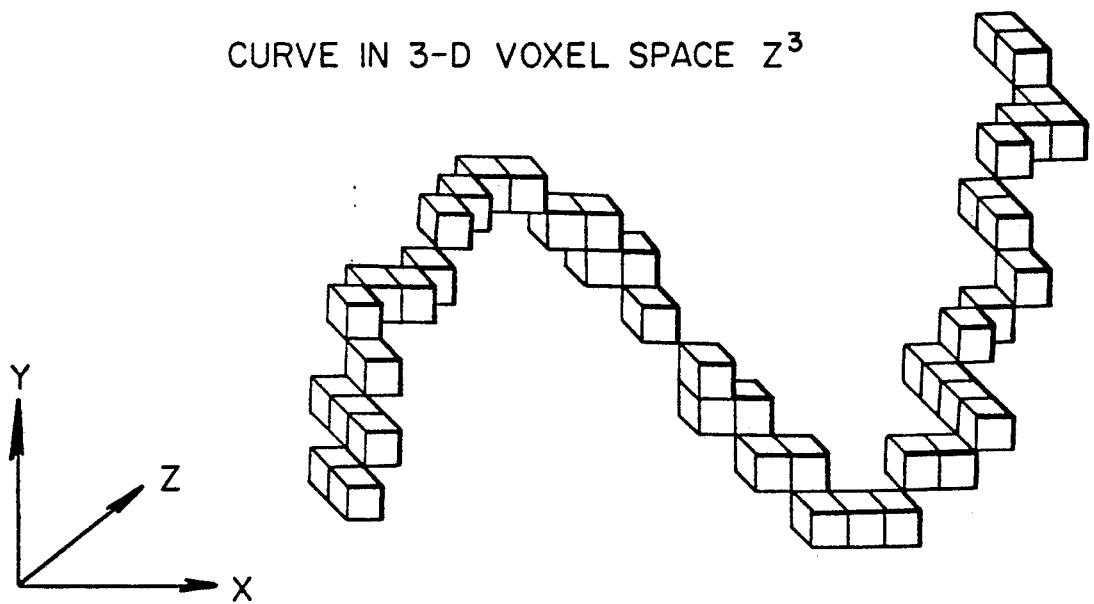

Referring now to FIGS. 10 and 10A, the method for scan-converting continuous 3-D $K^{th}$ order parametric polynomial curve segments, is described below as follows:

For purposes of illustration, the case of cubic polynomial of Bezier form will be considered. In FIG. 10, a 3-D cubic polynomial curve segment $f(t)$ is represented in vector form as $$f(t) = T M G$$

where $T = [t^3 \ t^2 \ t^1 \ 1]$ $$\text{where } G = \begin{bmatrix} G_1 \\ G_2 \\ G_3 \\ G_4 \end{bmatrix}, \text{ and}$$

$$\text{where } M = \begin{bmatrix} -1 & 3 & -3 & 1 \\ 3 & -6 & 3 & 0 \\ -3 & 3 & 0 & 0 \\ 1 & 0 & 0 & 0 \end{bmatrix}$$

where $G_1$ and $G_4$ are the first and second curve endpoints, respectively. T is the cubic polynomial vector, and G is a geometric control point vector, and M is a geometric basis matrix of Bezier form. In $R^3$ space, the parameter t varies from 0 to 1 (i.e. $0 \leq t \leq 1$).

The first stage of the scan-conversion method involves computing the value of integer n, in order to determine the number of sample points sampled along the parameter t of the continuous 3-D parameter cubic curve segment, so as to guarantee at least a 26-connectivity voxel set. Notably, the integer n corresponds to the number of voxels in the set of n voxels which are to be connected in 3-D discrete voxel-image space $Z^3$. Also, integer n corresponds to the number of decisional process loops to be carried out in the present method.

As with the scan-conversion method for "3-D straight lines" described above, integer n will take on different integer values depending on the type of voxel connectivity desired or required. For the case of 26-connected lines, n, the estimate for the length (in voxels) of the curve determined by the following procedure. First, $n_x$, $n_y$ and $n_z$ (which represent the "extent" of the discrete voxel-based curve along the x, y and z coordinate directions, respectively) are computed by the following formulas:

$$n_x = \max\left\{\left|\frac{dx(0)}{dt}\right|, \left|\frac{dx(1)}{dt}\right|, \left|\frac{dx(\alpha)}{dt}\right|\right\}$$

$$n_y = \max\left\{\left|\frac{dy(0)}{dt}\right|, \left|\frac{dy(1)}{dt}\right|, \left|\frac{dy(\beta)}{dt}\right|\right\}$$

$$n_z = \max\left\{\left|\frac{dz(0)}{dt}\right|, \left|\frac{dz(1)}{dt}\right|, \left|\frac{dz(\gamma)}{dt}\right|\right\}$$

where $\alpha$, $\beta$ and $\Gamma$ are the t values for which the linear second derivatives of the curve equation are respectively 0, provided that $0 \leq \alpha, \beta, \Gamma \leq 1$. The maximum magnitude of these extrema, $n = max(n_x, n_y, n_z)$, is the number of steps in the loop of the scan-conversion process for 26-connected 3-D parametric curve segments. Since n, as computed from the above equations, may not be an integer value, a numerical rounding-up operation is necessary to provide integer values.

The next stage of the scan-conversion method involves definition and initialization of the parameters and variables of the process.

This step involves defining a cubic finite forward difference (hereinafter FFD) matrix $E_n$ for the 3-D Bezier curve segment f(t), in $Z^3$ space, for which the parameter t takes on integer values from 0 to n. The FFD matrix $E_n$ is determined by numerically scaling up in magnitude the conventional FFD matrix $E_\epsilon$, by a positive integer scalar quantity, $2n^3$. FFD matrix $E_\epsilon$ is described in "3D Scan-Conversion Algorithms for Voxel-Based Graphics" referenced hereinbefore.

Notably, the positive integer scalar quantity $2n^3$ serves to transform all of the parameters and variables of the scan-conversion method hereof, into an all-integer process, thereby avoiding the use of (i) floating point arithmetic and (ii) numerical rounding (e.g. truncation) operations. The matrix form of the FFD matrix $E_n$ is given as follows:

$$E_n = 2n^3 E_\epsilon = \begin{bmatrix} 0 & 0 & 0 & 2n^3 \\ 2 & 2n & 2n^2 & 0 \\ 12 & 4n & 0 & 0 \\ 12 & 0 & 0 & 0 \end{bmatrix}$$

The definition and initialization step also involves calculating an initial cubic finite forward difference (FFD) vector for the 3-D Bezier curve segment on the basis of the cubic FFD matrix $E_n$, geometric basis matrix M, and geometric control point vector G, as follows:

$$\Delta f_o = \begin{bmatrix} \Delta^0 f_o \\ \Delta^1 f_o \\ \Delta^2 f_o \\ \Delta^3 f_o \end{bmatrix} = E_n M G$$

where
$\Delta^0 f_o$ is the initial voxel position,
$\Delta^1 f_o$ is the initial first order x, y, z slopes of the curve,
$\Delta^2 f_o$ is the initial second order x, y, z slopes of the curve,
$\Delta^3 f_o$ is the initial third order x, y, z slopes which is constant for the cubic curve segment of the preferred embodiment.

Prior to entering the decisional process loop for determining incrementally the x, y and z integer coordinate values for each voxel of the discrete set of n voxels in $Z^3$ space, three decision variables and two decision threshold are defined and initialized. In particular, the three decision variables, $\Delta^0 x$, $\Delta^0 y$, and $\Delta^0 z$ are defined and initially set to zero. Also, the first and second decision thresholds are defined as $n^3$ and $-n^3$, respectively, and a decision variable increment is defined as $2n^3$.

Next, the x, y and z integer coordinate values of the first endpoint of the Bezier curve, i.e. $G_1$, are assigned to the X, Y and Z registers of the 3-D Cubic Frame Buffer.

In general, entering the decisional process loop, the integer coordinate values $x_t$, $y_t$, and $z_t$ for each voxel $V_t$ are determined so that such integer coordinates are closest to a corresponding sample point of the 3-D Bezier curve in $R^3$ space. This process is carried out for each $x_t$, $y_t$ and $z_t$ integer coordinate value $t = 0, 1, \ldots n$, as follows:

For each x, y or z coordinate direction,
 (i) a decisional process is performed to determine whether to increment, decrement or not change the respective coordinate direction, and
 (ii) an updating procedure is carried out in order to update the respective cubic FFD vector $\Delta x_t$, $\Delta y_t$ and $\Delta z_t$.

For example, considering the decisional process for the x coordinate direction, the following procedure is performed. If the decision variable $\Delta^0 x$ is greater than the first (positive) decision threshold $n^3$, then register X is incremented by integer value "1", and the decision variable $\Delta^0 x$ is decremented by the decision variable increment $2n^3$. If on the other hand, $\Delta^0 x$ is less than the second (negative) decision threshold $-n^3$, then register X is decremented by integer value "1", and the decision variable $\Delta^0 x$ is incremented by decision variable increment $2n^3$. Otherwise, if none of the above conditions hold true, then register X is unchanged.

Considering now, the updating process for the x coordinate direction, the following procedure is performed as follows:

$$\Delta^0 x_{t+1} = \Delta^0 x_t + \Delta^1 x_t$$

$$\Delta^1 x_{t+1} = \Delta^1 x_t + \Delta^2 x_t$$

$$\Delta^2 x_{t+1} = \Delta^2 x_t + \Delta^3 x_t$$

$$\Delta^3 x_{t+1} = \Delta^3 x_t \text{ ("constant for all t")}$$

where t=0, 1, ..., $n^{th}$ stage of the scan-conversion process.

The above-described decision and updating process is subsequently carried out for the y and z coordinate directions.

Prior to the end of each stage of the scan-conversion decision loop, the voxel $V_t$ whose address is the X, Y and Z registers, is written into the 3-D Cubic Frame Buffer.

For the 6-connectivity and 18-connectivity type 3-D parametric polynomial curve segments in $Z^3$ space, similar processes as described above are performed, with however, several modifications described below.

In particular, for the 6-connected 3-D curve segment, integer n corresponds to the rounded-up value of $n_x + n_y + n_z$. Also, the decision logic in the decisional process loop is different. In particular, the decisional logic seeks to determine the largest decision variable of $\Delta^o x$, $\Delta^o y$ and $\Delta^o z$, and then increments or decrements only along that respective coordinate direction. For example, if decision variable $\Delta^o x$ is greater than or equal to both $\Delta^o y$ and $\Delta^o z$, then it is only possible to step along the x coordinate direction. In such a case, if $\Delta^o x$ is greater than the first decision threshold $n^3$, x is incremented by an integer value "1", and decision variable case, if $\Delta^o x$ is decremented by the decision variable increment $2n^3$. If on the other hand, $\Delta^o x$ is less than the second decision threshold $-n^3$, then x is decremented by an integer value "1" and $\Delta^o x$ is incremented by the decision variable increment $2n^3$. If none of the above conditions holds true, then x is unchanged.

For the 18-connected 3-D parametric polynomial curve segment, integer n corresponds to the rounded-up value of $$MAX[MAX(n_x, n_y, n_z), CEILING[(n_x+n_y+n_z)/2]].$$

Also, the decision logic in the decisional process loop is different. In particular, the decisional logic seeks to determine the two largest decision variables of $\Delta^o x$, $\Delta^o y$ and $\Delta^o z$, and then decides whether or not to increment or decrement along the two respective coordinate directions. For example, if decision variables for the largest two coordinate directions are y and z, then x is unchanged and two independent decision procedures for coordinate directions y and z are carried out. For example, for the y coordinate direction, if decision variable $\Delta^o y$ is greater than the first decision threshold $n^3$, then y is incremented by an integer value "1", and decision variable $\Delta^o y$ is decremented by the decision variable increment $2n^3$. If however, on the other hand, the decision variable $\Delta^o y$ is less than the second decision threshold $-n^3$, then y is decremented by integer value "1" and decision variable $\Delta^o y$ is incremented by the decision variable increment $2n^3$. Otherwise, if none of the above conditions holds true, then y is unchanged.

Figure 11:
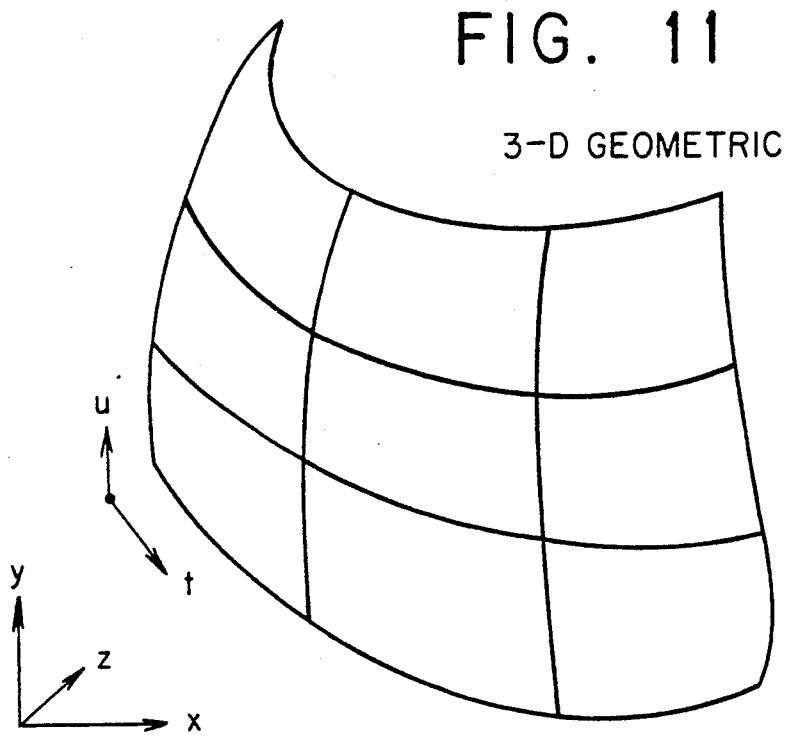
FIG. 11 is a schematic representation of a process of scan-converting continuous 3-D parametric polynomial surface patches represented in 3-D geometric space, into 3-D voxel-based representations in 3-D voxel-image space, according to the principles of the present invention.
Figure 11:
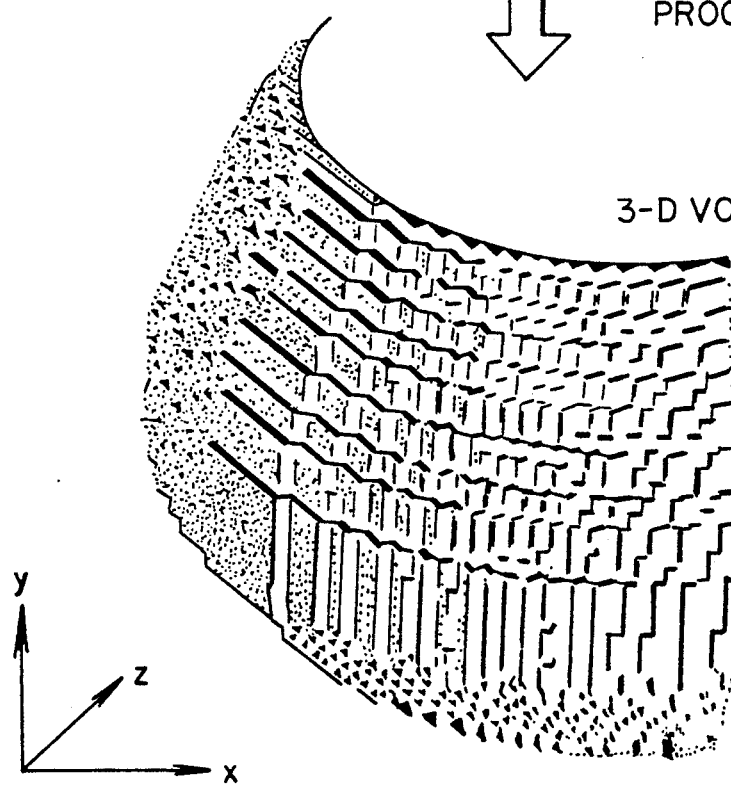

Referring now to FIGS. 11 and 11A, in particular, the method for scan-converting continuous 3-D bi-$K^{th}$ parametric polynomial surface patches is described below as follows.

For purposes of illustration, the case of bi-cubic polynomial of Bezier form will be considered. In FIG. 11, a 3-D bi-cubic polynomial surface patch f(t,u) is represented in vector form as $$f(t,u) = T\ M\ G\ M^+\ U^+$$

where $T = [t^3\ t^2\ t\ 1]$ where $U = [u^3\ u^2\ u\ 1]$ $$where\ G = \begin{bmatrix} G_{11} & G_{21} & G_{31} & G_{41} \\ G_{12} & G_{22} & G_{32} & G_{42} \\ G_{13} & G_{23} & G_{33} & G_{43} \\ G_{14} & G_{24} & G_{34} & G_{44} \end{bmatrix}$$

$$where\ M = \begin{bmatrix} -1 & 3 & -3 & 1 \\ 3 & -6 & 3 & 0 \\ -3 & 3 & 0 & 0 \\ 1 & 0 & 0 & 0 \end{bmatrix}$$

T and U are the bi-cubic polynomial vectors, G is a 4×4 control point matrix where $G_{11}$, $G_{14}$, $G_{41}$ and $G_{44}$ are the surface patch "corners", and M is a geometric basis matrix of Bezier form. $M^+$ and $U^+$ are the transposed matrices of M and U, respectively. In $R^3$ space, the parameters t and u each varies independently from 0 to 1 (i.e. $0 \leq t$, $u \leq 1$).

The first stage of the scan-conversion method involves computing the values of integers n and m, in order to determine the number of sample points sampled along the parameters t and u respectively, of the continuous 3-D bi-cubic Bezier surface patch, so as to guarantee the lack of tunnels amongst voxels in the converted voxel set. Notably, the integer value n×m corresponds to the number of voxels in the set of voxels which are to be connected in 3-D discrete voxel-image space, $Z^3$. Also, integer m corresponds to the number of steps in the "outer" decision process loops and integer n corresponds to the number of steps in the "inner" decision process loops, which are to be carried out in the present method. It is noted however, that integers n and m can be interchanged so that n corresponds to the number of steps in the outer decision process loops and m corresponds to the number of steps in the inner decision process loops.

As with the scan-conversion methods for 3-D Bezier curves, integers n and m will take on different values depending on the type of "connectivity" required amongst voxels. However, when specifying connectivity amongst voxels comprising surfaces, such specifications are made in terms of lack of "6-connected tunnels", lack of "18-connected tunnels", and lack of "26-connected tunnels".

To find estimates for n and m, first $n'_x$, $n'_y$ and $n'_z$ are computed by the following formulas:

$$n'_x max(G_x^n) - min(G_x^n)$$

$$n'_y = max(G_y^n) - min(G_y^n)$$

$$n'_z = max(G_z^n) - min(G_z^n)$$

where $G_{x,y,z}^n = M^{-1}\ D_t\ M\ G_{x,y,z}$ $$where\ D_t = \begin{bmatrix} 0 & 0 & 0 & 0 \\ 3 & 0 & 0 & 0 \\ 0 & 2 & 0 & 0 \\ 0 & 0 & 1 & 0 \end{bmatrix},\ and$$

where $M^{-1}$ is the inverse of matrix M.

For case of lack of "6-connected tunnel" surfaces, n equals the rounded-up value of:

$$\sqrt{3} \text{ MAX}[n_x', n_y', n_z']$$

Similarly, m is calculated using the $D_u$ matrix, but since symmetry provides $D_u = D_t^+$, m equals the rounded-up value of:

$$\sqrt{3} \text{ MAX}[m_x', m_y', m_z'],$$

where $m_x'$, $m_y'$ and $m_z'$ are computed by the following formula:

$$m_x' = max(G^m{}_x) - min(G^m{}_x)$$

$$m_y' = max(G^m{}_y) - min(G^m{}_y)$$

$$m_z' = max(G^m{}_z) - min(G^m{}_z)$$

Where $G^m{}_{x,y,z} = M^{-1} D_u M G_{x,y,z}$.

The next stage of the scan-conversion method involves definition and initialization of the parameters and variables of the process. This step involves defining bi-cubic FFD matrices $E_n$ and $E_m$ for the 3-D Bezier surface patch f(t,u) in $Z^3$ space, for which the parameter t takes on integer values from o to n, and parameter u takes on integer values from o to m. The FFD matrices $E_n$ and $E_m$ are determined by numerically scaling-up by positive integer scalar quantities, the conventional FFD matrices $E_\epsilon$ and $E_\delta$ which are expressed in terms of "floating-point" numbers. These positive integer scalar quantities are determined in such a way as to provide integer based FFD matrices $E_n$ and $E_m$. FFD matrices $E_\epsilon$ and $E_\delta$ are described in "3D Scan-Conversion Algorithms for Voxel-Based Graphics" referenced hereinbefore.

Notably, the positive integer scalar quantity $2n^3m^3$ is used to transform all the parameters and variables of the scan-conversion method hereof, into an all integer process, thereby avoiding the use of (i) floating point arithmetic and (ii) numerical rounding (e.g. truncation) operations.

The matrix form of the FFD matrices $E_n$ and $E_m$ are given as follows:

$$E_n = 2n^3 E_\epsilon = \begin{bmatrix} 0 & 0 & 0 & 2n^3 \\ 2 & 2n & 2n^2 & 0 \\ 12 & 4n & 0 & 0 \\ 12 & 0 & 0 & 0 \end{bmatrix}.$$

$$E_m = m^3 E_\delta = \begin{bmatrix} 0 & 0 & 0 & m^3 \\ 1 & m & m^2 & 0 \\ 6 & 2m & 0 & 0 \\ 6 & 0 & 0 & 0 \end{bmatrix}$$

The definition and initialization step also involves calculating an initial bi-cubic FFD matrix $\Delta f_{oo}$ for the 3-D Bezier surface patch, as follows:

$$\Delta f_{oo} = E_n MGM^+ E_m^+ = 2n^3m^3 E_\epsilon MGM^+ E_\delta^+ = \Delta f_{t=0, u=0}$$

$$\text{where } \Delta f_{oo} = \begin{bmatrix} \Delta^0 f_{oo} \\ \Delta^1 f_{oo} \\ \Delta^2 f_{oo} \\ \Delta^3 f_{oo} \end{bmatrix}$$

Notably, $\Delta f_{oo}$ is a 4×4 FFD matrix used in generating the Bezier surface patch f(t,u).

According to the principles of the present invention, the method for scan-converting a 3-D bi-cubic parametric surface patch employs the FFD matrix $\Delta f_{t,u}$ which is updated in an iterative fashion, in order to compute the bi-cubic surface patch f(t,u) as a sequence of cubic curve segments f(t,o), f(t,1) ... f(t,m). For the generation of each of these curve segments, the "inter-curve parameter" u is held constant while the "intra-curve parameter" t varies from o to n, thereby sweeping the entire surface patch f(t,u).

The FFD matrix $\Delta f_{t,u}$ is iteratively updated by an updating procedure, for example, as follows.

For the "inter-curve" procedure, column one of the FFD matrix is added to column zero, column two is added to column one, and column three is added to column two. On the other hand, for the "intra-curve" updating procedure, the first element of the zeroth column is added to the zeroth element, the second element is added to the first element, and the third element is added to the second element of the zeroth column. Notably, parameters t and u in the above-described FFD matrix updating procedure, can be interchanged with one another, and the rows of the matrix are updated instead of the columns.

Prior to entering the decisional process loop for determining the x, y and z integer coordinate values for each voxel, three surface integer decision variables $\Delta^{oo}x_{tu}$, $\Delta^{oo}y_{tu}$, and $\Delta^{oo}z_{tu}$ are defined, and initialized by setting them to zero. Also, the first and second decision thresholds are defined as $n^3m^3$ and $-n^3m^3$, respectively, and the decision variable increment is defined as $2n^3m^3$.

In general, the "outer" decisional process loop is for carrying out the "inter-curve" iteration, i.e. for u=0, 1, ... m. Upon entering the outer loop for u=0, the x, y and z coordinate values for first endpoint of the $(u=0)^{th}$ curve segment are written into the X, Y, Z registers of the 3-D Cubic Frame Buffer.

The next step involves forming an initial FFD vector for the $(u=0)^{th}$ curve segment, by copying the first column of the initial FFD matrix $\Delta^{oo}f_{oo}$ into the FFD vector $\Delta f_t$.

Subsequently, three curve integer decision variables $\Delta^o x_t$, $\Delta^o y_t$ and $\Delta^o x_t$ are defined, and initialized by setting them equal to zero.

Next, the $(u=0)^{th}$ curve segment is scan-converted by a decision process loop (i.e. the intra-curve iteration for t=0, 1, ... n), which is similar to the decision process loop described in FIG. 10A and hereinbefore. However, there are several minor differences described below. The decision thresholds are $\pm n^3m^3$ rather than $\pm n^3$, and the decision variable increment is $2n^3m^3$ instead of $2n^3$. Except for minor notational differences, the decision process loop for intra-curve iteration is substantially similar to the decision process loop for curve segment scan conversion.

Considering now the "inter-curve" updating process for the FFD matrix, a matrix updating procedure is performed, for example, as described hereinbefore in the "inter-curve procedure".

Thereafter, an "inter-curve" decision process is carried out to determine the x, y and z coordinate values which are closest to the first endpoint of the next $(u+1)^{st}$ curve segment. Here, three surface integer decision variables $\Delta^\infty x_{tu}$, $\Delta^\infty y_{tu}$ and $\Delta^\infty z_{tu}$ are employed in the "inter-curve" decision process as follows.

In the preferred embodiment, the coordinate determination procedure for x, y and z coordinate directions, are independent. For example, considering the decisional process for the x coordinate direction, the following procedure is performed. If the surface decision variable $\Delta^\infty x_{tu}$ is greater than the first (positive) decision threshold $n^3m^3$, then the coordinate direction x is incremented by integer value "1", and the surface decision variable is decremented by the decision variable increment $2n^3m^3$. If on the other hand, $\Delta^\infty x_{tu}$ is less than the second (negative) decision threshold $-n^3m^3$, then x is decremented by integer value "1" and the surface decision variable is incremented by the decision variable by $2n^3m^3$. Otherwise, if none of the above conditions hold true, then x is unchanged.

The "inter-curve" decision and updating processes described above, are carried out subsequently (or simultaneously by parallel processing) for the y and z coordinate directions.

Upon completion of the entire outer loop for integer $u=0$, the entire outer loop is repeated for $u=1, 2, \ldots m$, thereby scan-converting the plurality of 3-D cubic Bezier curves which together form the entire 3-D bicubic Bezier surface patch.

In the preferred embodiment described above for 3-D parametric polynomial surface patches, the value of integers n and m and the logic in both the inner and outer decisional process loops, have been selected so as to guarantee the generation of an $n \times m$ voxel set in $Z^3$ space which lacks 6-connected tunnels. Specifically, both the "inner" and "outer" decisional process loops in the method employed "26-connected" logic. However, according to the present invention, voxel-represented surfaces in $Z^3$ space can be generated so to lack 18-connected tunnels and/or 26-connected tunnels, by varying:

(i) integer n as similarly computed for the different connectivity-cases of 3-D parametric polynomial curve segments, and the logic of the inner decision process loop (i.e. intra-curve iteration); and/or (ii) integer m as similarly computed for the different connectivity-cases of 3-D parametric polynomial curve segments, and the logic of the outer decisional process loop (i.e. inter-curve iteration).

Figure 12:
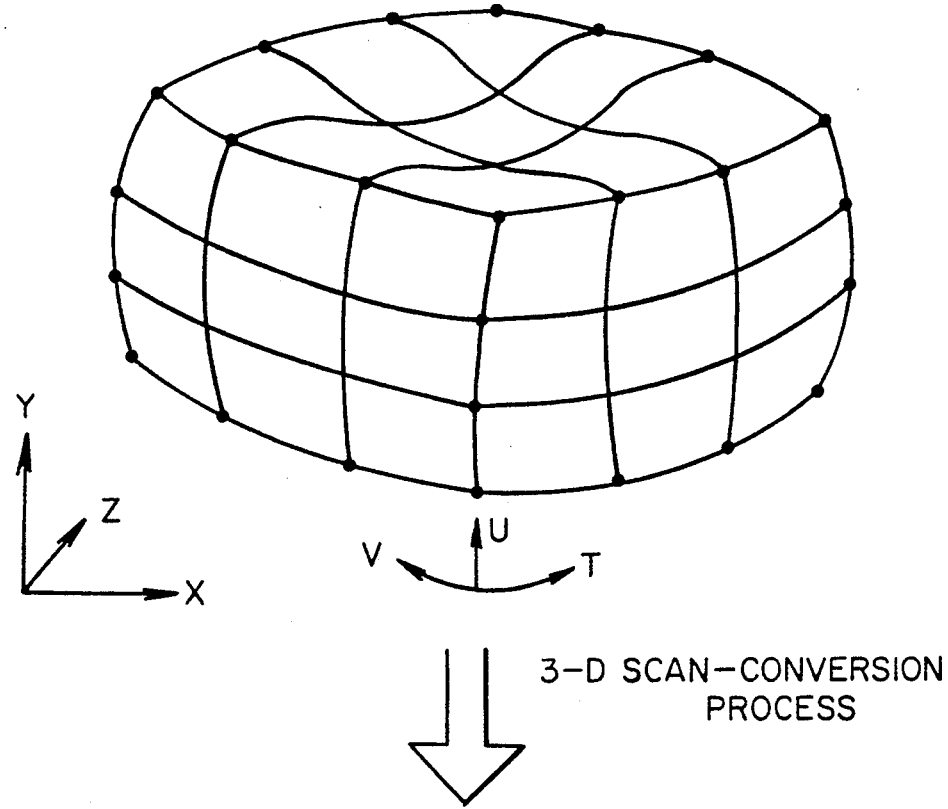
FIG. 12 is a schematic representation of a process for scan-converting continuous 3-D parametric volume elements in 3-D geometric space, into 3-D voxel-based representations in discrete 3-D voxel-image space; according to the principles of the present invention.
Figure 12:
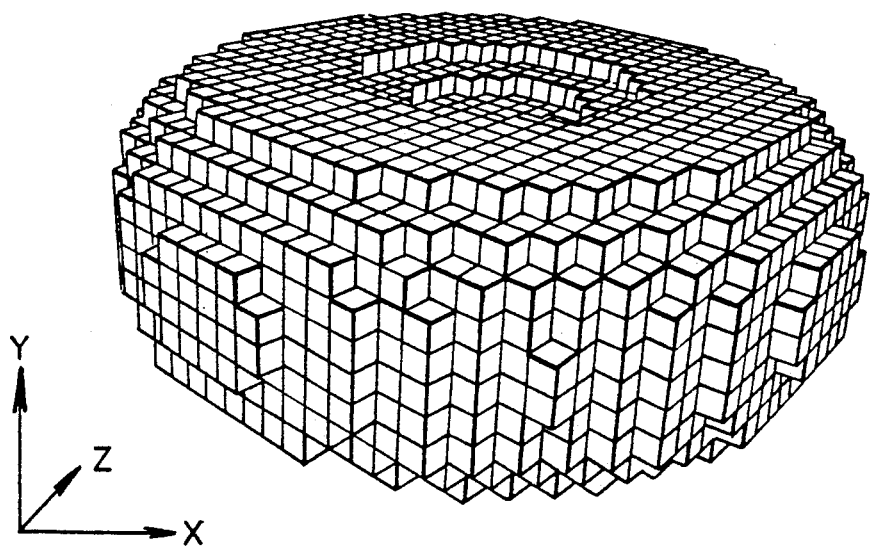

Referring now to FIGS. 12 and 12A, in particular, the method for scan-converting continuous 3-D tri-$K^{th}$ parametric polynomial volume elements, is described below as follows:

For purposes of illustration, the case of tri-cubic polynomial of Bezier form will be considered. In FIG. 12, a continuous 3-D tri-cubic polynomial volume element $f(t, u, v)$ is shown. Volume element $f(t, u, v)$ is represented in summation notation as follows:

$$f(t, u, v) = \sum_{i=0}^{3} \sum_{j=0}^{3} \sum_{k=0}^{3} h_i(t) h_j(u) h_k(v) g_{ijk}$$

where $h_i(t)$, $h_j(u)$, and $h_k(v)$ are the three geometric basis functions, and $g_{ijk}$ are the components of the geometric tensor. The properties of the Bezier curves and surfaces hold also for the Bezier type volumes. In particular, the $4 \times 4 \times 4$ geometric control point tensor G with elements $g_{ijk}$ comprises the 64 Bezier control points of the tri-cubic Bezier volume elements $f(t, u, v)$. In the parameters t, u, and v, each varies from 0 to 1 (i.e. $0 \leq t, u, v \leq 1$) in $R^3$ space.

The first stage of the scan-conversion method involves computing the values of integers n, m and l, in order to determine the number of sample points sampled along the parameters t, u, and v, respectively, of the continuous 3-D tri-cubic Bezier volume element $f(t, u, v)$, so as to guarantee the lack of "cavities" in the converted voxel set. Notably, the integer value $n \times m \times l$ corresponds to the number of voxels in the set of voxels which is to be connected together in 3-D discrete voxel-image space $Z^3$. Also, integer l corresponds to the number of steps in "outermost" decision process loop, and integer m corresponds to the number of steps in the "intermediate" decision process loop, whereas integer n corresponds to the number of steps in the "inner" process loops to be carried out in the present method. It is also noted that the integers n, m and l can all be interchanged with one another so that either n, m, or l can correspond with the number of steps in any one of the outermost, intermediate and inner decision process loops.

As with the scan-conversion method for 3-D Bezier curves, integers n, m and l will take on different values depending on the type of "connectivity" required or desired amongst the discrete voxel set. However, when specifying connectivity amongst voxels comprising volume elements, such specifications are made in terms of three principal types of "lack of cavities", i.e. lack of 6-connected cavities, 18-connected cavities, and 26-connected cavities.

To find estimates for n, m and l, first $n'_x$, $n'_y$, $n'_z$, $m'_x$, $m'_y$, $m'_z$, $l'_x$, $l'_y$ and $l'_z$ are computed by the following formulas:

$$n'_x = \text{MAX}(G_x^n) - \text{MIN}(G_x^n)$$
$$n'_y = \text{MAX}(G_y^n) - \text{MIN}(G_y^n)$$
$$n'_z = \text{MAX}(G_z^n) - \text{MIN}(G_z^n)$$
$$m'_x = \text{MAX}(G_x^m) - \text{MIN}(G_x^m)$$
$$m'_y = \text{MAX}(G_y^m) - \text{MIN}(G_y^m)$$
$$m'_z = \text{MAX}(G_z^m) - \text{MIN}(G_z^m)$$
$$l'_x = \text{MAX}(G_x^l) - \text{MIN}(G_x^l)$$
$$l'_y = \text{MAX}(G_y^l) - \text{MIN}(G_y^l)$$
$$l'_z = \text{MAX}(G_z^l) - \text{MIN}(G_z^l)$$

where $G_{x,y,z}^i$ for $i = n, m$ and l is determined in fashion similar to the procedure described in the method of converting continuous 3-D Bezier surface patches.

For the case of a volume element lacking any type of "cavities,", n m and l are equal to the rounded-up values of $$\sqrt{3}(n'_x + n'_y + n'_z)$$

$$\sqrt{3}(m'_x + m'_y + m'_z)$$

-continued $$\sqrt{3} (l_x' + l_y' + l_z'),$$

respectively.

The next step of the scan-conversion method involves initialization and definitions of parameters and variables of the process. This step involves defining tri-cubic FFD matrices $E_n$, $E_m$, and $E_l$ for the 3-D Bezier volume element $f(t, u, v)$ in $Z^3$ space, for which the parameter t takes on integer values from 0 to n, parameter u takes on integer values from 0 to m, and parameter v takes on integer values from o to 1.

The FFD matrices $E_n$, $E_m$, and $E_l$ are determined by numerically scaling-up by positive integer scalar quantities, the conventional FFD matrices $E_\epsilon$, $E_\delta$ and $E_\mu$ which are expressed in terms of "floating point" numbers. These positive integer scalar quantities are determined in such a way as to provide integer-based FFD matrices $E_n$, $E_m$, and $E_l$.

Notably, the positive integer scalar quantity $2n^3m^3l^3$ is used to transform all the parameters and variables of the scan-conversion method hereof, into an all integer process, thereby avoiding the use of (i) floating point arithmetic, and (ii) numerical rounding (e.g. truncation) operations.

The matrix form of the FFD matrices $E_n$, $E_m$ and $E_l$ are given as follows:

$$E_n = 2n^3 E_\epsilon = \begin{bmatrix} 0 & 0 & 0 & 2n^3 \\ 2 & 2n & 2n^2 & 0 \\ 12 & 4n & 0 & 0 \\ 12 & 0 & 0 & 0 \end{bmatrix}$$

$$E_m = m^3 E_\delta = \begin{bmatrix} 0 & 0 & 0 & m^3 \\ 1 & m & m^2 & 0 \\ 6 & 2m & 0 & 0 \\ 6 & 0 & 0 & 0 \end{bmatrix}$$

$$E_l = l^3 E_\mu = \begin{bmatrix} 0 & 0 & 0 & l^3 \\ 1 & 1 & l^2 & 0 \\ 6 & 2l & 0 & 0 \\ 6 & 0 & 0 & 0 \end{bmatrix}$$

The initialization and determination step also includes calculating an initial tri-cubic FFD tensor $\Delta f_{ooo}$ for the 3-D Bezier volume element, as follows:

$$\Delta f_{ooo} = \begin{bmatrix} \Delta^0 f_{ooo} \\ \Delta^1 f_{ooo} \\ \Delta^2 f_{ooo} \\ \Delta^3 f_{ooo} \end{bmatrix} = \Delta f_{t=o, u=o, v=o}.$$

Notably, the initial tri-cubic FFD tensor is computed in a manner similar to that of the bi-cubic FFD matrix. In addition, $\Delta f_{ooo}$ is a $4 \times 4 \times 4$ FFD tensor used in generating the 3-D Bezier volume element $f(t,u,v)$.

The method of the present invention involves computing the tri-cubic volume element $f(t,u,v)$ as a sequence of 3-D bi-cubic surface patches $f(t,u,o)$, $f(t,u,1)$, ..., $f(t,u,l)$.

For the generation of each of these surface patches, the "inter-surface" parameter v is held constant, while the "intrasurface" parameters t and u vary from 0 to n, and 0 to m, respectively, thereby sweeping the entire volume element $f(t,u,v)$. Each of the surface patches $f(t,u,i)$ for $i=0, 1, \ldots, l$, can be generated as a sequence of cubic curve segments, using, for example, the method for scan-converting surface patches described hereinbefore.

The FFD tensor $\Delta f_{tuv}$ is iteratively updated by a tensor updating procedure, for example, as follows. For the "intersurface" updating procedure, layer one of the FFD tensor is added to layer zero, layer 2 is added to layer one, and layer three is added to layer two. Since layer zero corresponds now to the FFD matrix of the 3-D Bezier surface patch, the intercurve and intra-curve updating procedures described hereinbefore for surface patches, can be employed in updating the zero layer of the FFD tensor for the intra-surface updating procedure. The parameters t, u, and v in the above-described tensor updating procedure, can be interchanged with one another, and layers in the horizontal, vertical and axial directions of the tensor can be interchanged, as well can be rows and columns of the layers.

Prior to entering the decisional process loop for determining the x, y and z integer coordinate values for each voxel, three volume integer variables $\Delta^{ooo}x_{tuv}$, $\Delta^{ooo}y_{tuv}$, and $\Delta^{ooo}z_{tuv}$ are defined, and initialized by setting them to zero. Also, the first and second decision thresholds are defined as $n^3m^3l^3$ and $-n^3m^3l^3$ respectively, and the decision variable increment is defined as $2n^3m^3l^3$.

In general, the "outermost" decisional process loop is for carrying out the "inter-surface" iteration, i.e. for $v=0, 1, \ldots l$. Upon entering the outermost loop for $v=0$, an initial bi-cubic FFD matrix for the $(v=0)^{th}$ surface patch is formed by copying the $(t, u, v=0)^{th}$ layer of the FFD tensor into the FFD matrix. Thereafter, three surface integer decision variables $\Delta^{oo}x_{tu}$, $\Delta^{oo}y_{tu}$ and $\Delta^{oo}z_{tu}$ are defined, and initialized by setting them to zero.

Next, the $(t, u, v=0)^{th}$ surface patch is scan-converted by a decisional process loop, i.e. the intra-surface iteration for $u=0, 1, 2, \ldots m$ which is similar to the decisional process loop described in FIG. 11A, and hereinbefore. However, there are several minor differences described below. First, since any type of cavities in the voxel set is to be avoided, the decision process loop employs logic which ensures 6-connectivity amongst neighboring voxels in each v-th surface patch.

Considering now the "inter-surface" updating procedure for the FFD tensor, a tensor updating procedure is performed for example, as described hereinbefore. This involves adding layer one of the FFD tensor to layer zero, adding layer two to layer one, and adding layer three to layer two.

Thereafter, an inter-surface decision process is carried out to determine the x, y and z coordinate values which are closest to the first endpoint of the $(u=0)^{th}$ curve segment of the next $(v+1)^{th}$ surface patch. Here, three volume integer decision variables $\Delta^{ooo}x_{tuv}$, $\Delta^{ooo}y_{tuv}$ and $\Delta^{ooo}z_{tuv}$ are employed in the "inter-surface" decision process as follows.

In the preferred embodiment, the coordinate determination process for x, y and z coordinate directions follow a 6-connected decision process, as follows. If the volume decision variable for x, $\Delta^{ooo}x_{luv}$ is the largest in magnitude (i.e. absolute value), then an increment or decrement only along the x coordinate direction is possible. Specifically, if the volume decision variable for x is larger than the first decision threshold $n^3m^3l^3$, then x is incremented by integer value "1", and the volume decision variable for x is decremented by decision variable increment $2n^3m^3l^3$. If on the other hand, the volume decision variable for x is smaller than the second decision threshold $-n^3m^3l^3$, then x is decremented by integer value "1" and the volume decision variable for x is incremented by the decision variable increment $2n^3m^3l^3$. Otherwise, if none of the above conditions holds true, then x is unchanged.

However, if the volume decision variable for y is the largest in magnitude, then an increment or decrement is only possible along the y coordinate direction. In this case, the same decision process described above for x, is used.

Similarly, if the volume decision variable for z is the largest in magnitude, then an increment or decrement is only possible along the z coordinate direction. In this case, the same decision processes described for x or y, is used.

Upon completion of the entire "outermost" decision process loop for integer v=0), the entire outermost loop is repeated for v=1, 2, ..., 1, thereby scan-converting the plurality of 3-D bi-cubic Bezier surface patches, which together form the entire 3-D tri-cubic Bezier volume element.

In the preferred embodiment described above for 3-D parametric polynomial volume elements, the values of integers n, m and 1 and the logic of the outermost, intermediate and inner decisional process loops, have been selected so as to guarantee the generation of an $n \times m \times 1$ voxel set in $Z^3$ space, which lacks any type of "cavities". In connection therewith, a cavity is understood as being a tunnel through a solid volume element comprising voxels. Thus, different types of tunnels define different types of cavities.

In the preferred embodiment, all three of the decisional process loops referred to above, employ "6-connected" logic. However, according to the present invention, voxel-represented volumes in $Z^3$ space can be generated so to lack other kinds of cavities, by varying:
(i) integer n as computed for the different connectivity cases of 3-D parametric polynomial curve segments, and the logic of the inner decision process loop (i.e. intra-curve iteration); and/or
(ii) integer m as similarly computed for the different connectivity cases of 3-D parametric polynomial curve segments, and the logic of the intermediate decisional process loop (i.e. inter-curve or intrasurface iteration); and/or
(iii) integer 1 as similarly computed for the different connectivity cases of 3-D parametric polynomial curve segments and logic of the outermost decisional process loop (i.e. inter-surface iteration).

While the particular embodiments shown and described above have proven to be useful in many applications involving the voxel-based graphics arts, further modifications herein disclosed will occur to persons skilled in the art to which the present invention pertains and also such modifications are deemed to be within the scope and spirit of the present invention defined by the appended claims.

What is claimed is:

1. A method of converting a continuous 3-D straight line segment into a discrete set of voxels connected together in discrete 3-D voxel space, said 3-D straight line segment being defined by two endpoints $P_1$ and $P_2$ each having integer coordinates and specifying extents of x, y and z coordinate directions of said 3-D straight line segment, said discrete 3-D voxel space being characterized by orthogonal x, y, and z coordinate directions, the addresses of said discrete 3-D voxel space being specified by integer x, y and z coordinate values of said voxels, said method comprising the sequence of steps of:
   (a) computing the value of an integer n to determine the number of sample points sampled along said continuous 3-D straight line segment, said sample points and said integer n represents the number of said voxels in said discrete set;
   (b) defining
       integer voxel-coordinate error variables for said x, y, and z coordinate directions, and
       first and second error variable increments along each said x, y and z coordinate directions;
   (c) specifying the initial values of said integer error variables;
   (d) placing into said discrete 3-D voxel space, said voxel having x, y and z coordinate values of said first end point $P_1$ of said sampled 3-D straight line segment; and
   (e) converting voxels corresponding to said sample points of said discrete set of voxels, in said discrete 3-D voxel space.

2. The method of claim 1, wherein step (e) comprises, for the subsequent voxel of said discrete set of voxels, in a symmetrical loop,
   (i) determining said integer coordinate values in said x, y and z coordinate directions which are closest to a corresponding sample point of said continuous 3-D line segment, said determination of said integer x, y and z coordinate values being determined on the basis of said integer error voxel-coordinate variables and said first and second error variable increments for x, y and z coordinate directions;
   (ii) updating said error voxel-coordinate variables for said x, y and z coordinate directions, on the basis of respective first and second error variable increments;
   (iii) placing into said discrete 3-D voxel space, said voxel having said integer x, y and z coordinate values determined in step (e)(i); and
   (f) repeating in a loop fashion, step (e) for the subsequent voxel of said discrete set of voxels, until said integer coordinate values for the last voxel is determined, whereby said continuous 3-D straight line segment is converted into said discrete set of voxels connected together in said discrete 3-D voxel space.

3. The method of claim 2, wherein step (b) comprises defining said integer voxel-coordinate error variables for said x, y and z coordinate directions and said first and second error variables increments along each said x, y and z coordinate directions, each on the basis of said x, y and z extents and said integer n.

4. The method of claim 2, wherein step (a) comprises setting said integer n to an integer value proportional in magnitude to the maximum of said x, y and z extents, and wherein step (e)(i) comprises determining said x, y and z integer coordinate values by independently stepping along said x, y and/or z coordinate directions.

5. The method of claim 2, wherein step (a) comprises setting said integer n to an integer value proportional in magnitude to the sum of said x, y and z extents, and
wherein said step (e)(i) comprises
determining said x, y and z integer coordinate values by stepping along only one of said x, y and z coordinate directions.

6. The method of claim 2, wherein step (a) comprises setting said integer value n to an integer value proportional in magnitude to the maximum of
(1) the maximum of said x, y and z extents, and
(2) the ceiling of one-half of the sum of said x, y and z extents, and
wherein step (e)(i) comprises
determining said x, y and z integer coordinate values by stepping along
x and/or y,
or y and/or z,
or x and/or z coordinate directions.

7. A method of converting a continuous 3-D parametric polynomial curve segment into a discrete set of voxels connected together in discrete 3-D voxel space, said 3-D parametric curve segment having first and second endpoints and being defined by a $k^{th}$ order polynomial vector T, a geometric basis matrix M, a geometric control point vector G, parameter t, and an integer step size along said parameter t, said discrete 3-D voxel space being characterized by orthogonal x, y, z coordinate directions, the addresses of said discrete 3-D voxel space being specified by integer x, y and z coordinate values of said voxels, said method comprising the sequence of steps of:

(a) computing the value of integer n corresponding to the number of sample to be sampled along said parameter t of said continuous 3-D parametric polynomial curve segment, said integer n being determined so that consecutive voxels of said discrete set of voxels are connected;

(b) defining a $K^{th}$ order integer finite forward difference matrix for said 3-D parametric polynomial curve segment, for which said parameter t takes on integer values from o to n;

(c) determining an initial $K^{th}$ order finite forward difference vector for said 3-D parametric polynomial curve segment, on the basis of said $K^{th}$ order finite forward difference matrix, said geometric basis matrix M, and said geometric control point vector G;

(d) defining integer decision variables for said x, y and z coordinate directions, first and second decision thresholds based on n, and a decision variable increment based on n;

(e) specifying an initial value for each said integer decision variable of step (d);

(f) placing into said discrete 3-D voxel space, said voxel having x, y, and z coordinate values corresponding to the first endpoint of said 3-D parametric polynomial curve segment; and (g) converting said continuous 3-D parametric polynomial curve segment into said discrete set of voxels, said conversion being based on said integer decision variables, said first and second thresholds, said decision variable increment, and said first endpoint.

8. The method of claim 7, wherein step (g) comprises: for each integer value of said parameter t from o to n, (i) determining said integer coordinate values in the x, y and z coordinate directions which are closest to a corresponding sample point of said 3-D parametric polynomial curve segment, said determination of said integer x, y and z coordinate values being determined on the basis of said integer decision variables defined in step (d) and said first and second decision thresholds;

(ii) updating said integer decision variables using said decision variable increment, and updating said finite forward difference vector, (iii) placing into said discrete 3-D voxel space, said voxel having said integer x, y and z coordinate values determined in step (i); and (iv) repeating in a loop fashion, steps (i), (ii) and (iii) for the subsequent voxels of said discrete set of n voxels, until said integer coordinate values for last voxel is determined, whereby said 3-D continuous parametric polynomial curve segment is converted into said discrete set of voxels connected together in said discrete 3-D voxel space.

9. A method of converting a continuous 3-D parametric polynomial surface patch into a discrete set of voxels connected together in discrete 3-D voxel space, said 3-D parametric polynomial surface patch being defined by bi-$K^{th}$ order polynomial vectors T and U, a geometric basis M, a geometric control point matrix G, and parameters t and u each with an integer step size, said 3-D parametric polynomial surface patch being formed by a plurality of 3-D parametric polynomial curve segments each having first and second endpoints, said discrete 3-D voxel space being characterized by orthogonal x, y, and z coordinate directions, the addresses of said discrete 3-D voxel space being specified by integer x, y, and z coordinate values of said voxels, said method comprising the sequence of steps of:

(a) computing the values of integers n and m corresponding to the number of sample points to be sampled along said parameters t and u, respectively, of said continuous 3-D parametric polynomial surface patch, said integers n and m being determined so that a resulting set of voxels lack tunnels;

(b) defining first and second bi-$K^{th}$ order integer finite forward difference matrices for said 3-D parametric polynomial surface patch, said first bi-$K^{th}$ order finite forward difference matrix corresponding to said parameter t which takes on integer values from o to n, and said second bi-$K^{th}$ order finite forward difference matrix corresponding to said parameter u which takes on integer values from o to m;

(c) determining an initial bi-$K^{th}$ order finite forward difference matrix for said 3-D parametric polynomial surface patch, on the basis of said first and second bi-$K^{th}$ order finite forward difference matrices, said geometric basis matrix M, and said geometric control point matrix G;

(d) defining surface integer decision variables for said x, y and z coordinate directions, and first and second decision thresholds based on n and m, and a decision variable increment based on n and m;

(e) specifying an initial value for each said surface integer decision variable of step (d); and (f) converting said continuous 3-D parametric polynomial surface patch into said discrete set of voxels, said conversion being based on said integer decision variables, said first and second thresholds, said decision variable increment, and said first endpoint.

10. The method of claim 9, wherein step (f) comprises:
for each integer value of u from o to m, converting a u-th continuous 3-D parametric polynomial curve segment by holding constant said parameter u and varying parameter t from o to n, by
(i) placing into said discrete 3-D voxel space, said voxel corresponding with said first endpoint of said u-th 3-D parametric polynomial curve segment,
(ii) forming an initial $K^{th}$ order finite forward difference vector for said u-th 3-D parametric polynomial curve segment on the basis of said initial bi-$K^{th}$ order finite forward difference matrix for said 3-D parametric polynomial surface patch,
(iii) defining curve integer decision variables for said x, y and z coordinate directions for said u-th 3-D parametric polynomial curve segment,
(iv) specifying an initial value for each curve integer decision variable,
(v) converting said u-th 3-D parametric polynomial curve segment into said discrete set of voxels,
(vi) updating said finite forward difference matrix,
(vii) determining said integer coordinate values in said x, y, and z coordinate directions which are closest to said first endpoint of the $(u+1)^{st}$ 3-D parametric polynomial curve segment, said determination of said integer coordinate values being determined on the basis of said surface integer decision variables defined in step (d) and said first and second decision thresholds, and
(viii) updating said surface integer decision variables using said integer decision variable increment.

11. The method of claim 10, wherein step (v) further comprises: for each integer value of said parameter t from o to n,
(1) determining said integer coordinate values in the x, y and z coordinate directions which are closest to a corresponding sample point of said u-th 3-D parametric polynomial curve segment, said determination of said integer x, y, and z coordinate values being determined on the basis of said curve integer decision variables and said first and second decision thresholds;
(2) updating said curve integer decision variables using said decision variable increment;
(3) updating said finite forward difference vector for the u-th 3-D parametric polynomial curve segment, formed in step (ii);
(4) placing into said discrete 3-D voxel space, said voxel having said integer x, y and z coordinate values determined in step (1); and
(5) repeating in a loop fashion, steps (1), (2), (3), and (4) for the subsequent voxels of said discrete set of voxels, until said integer coordinate values for last voxel are determined.

12. A method of converting a continuous 3-D parametric polynomial volume element into a discrete set of voxels connected together in discrete 3-D voxel space, said 3-D parametrical polynomial volume element being defined by cubic order polynomial vectors T, U and V, a geometric basis M, a geometrical control point tensor G, and parameters t, u, and v each with an integer step size, said 3-D parametric polynomial volume element being formed by a plurality of 3-D parametric polynomial surface patches each of which is formed by a plurality of 3-D parametric polynomial curve segments each having first and second endpoints, said discrete 3-D voxel space being characterized by orthogonal x, y and z coordinate directions, the addresses of said discrete 3-D voxel space being specified by integer x, y and z coordinate values of said voxels said method comprising the sequence of steps of:
(a) computing the values of integers n, m and 1 corresponding to the number of sample points to be sampled along said parameters t, u and v, respectively, of said 3-D parametric polynomial volume element, said integers n, m and 1 being determined so that a resulting set of voxels lack cavities;
(b) defining first, second and third integer finite forward difference matrices for said 3-D parametric polynomial voxel element, said first finite forward difference matrix corresponding to said parameter t which takes on integer values from o to n, said second finite forward difference matrix corresponding to said parameter u which take on integer values from o to m, and said third finite forward difference matrix corresponding to said parameter v which takes on integer values from o to 1;
(c) determining an initial order finite forward difference tensor for said 3-D parametric polynomial volume element, on the basis of said first, second and third order finite forward difference matrices, said geometric basis matrix M, and said geometric control point tensor G;
(d) defining volume integer decision variables for said x, y and z coordinate directions, first and second decision thresholds based on n, m and 1, and a decision variable increment based on n, m, and 1;
(e) specifying an initial value for each said integer decision variable of step (d); and
(f) converting said continuous 3-D parametric polynomial volume element into said discrete set of voxels, said conversion being based on said integer decision variables, said first and second decision thresholds, said decision variable increment, and said first endpoint.

13. The method of claim 12, wherein step (f) comprises:
for each integer value v from o to 1, converting a v-th continuous 3-D parametric surface patch by holding constant said parameter v and varying parameter u from o to m and varying parameter t from o to n,
(i) forming an initial $K^{th}$ order finite forward difference matrix for said v-th 3-D parametric polynomial surface patch, on the basis of said tri-$K^{th}$ order finite forward difference tensor for said 3-D parametric polynomial volume element,
(ii) defining surface integer decision variables for said x, y and z coordinate directions, for said v-th 3-D parametric polynomial surface patch,
(iii) specifying an initial value for each said surface decision variable,
(iv) converting said v-th 3-D parametric polynomial surface patch into a discrete set of voxels,
(v) updating said finite forward difference tensor,
(vi) determining said integer coordinate values in said x, y and z coordinate directions which are closest to said first end point of said $(u=o)^{th}$ 3-D parametric polynomial curve segment of $(v+1)^{st}$ 3-D parametric polynomial surface patch, said determination of said integer coordinate values being determined on the basis of said volume integer decision variables defined in step (d) and said first and second decision thresholds.

14. The method of claim 13, wherein step (iv) further comprises: for each integer value u from o to m,
(I) placing into said discrete 3-D voxel space, said voxel corresponding with said endpoint of the u-th 3-D parametric polynomial curve segment of v-th 3-D parametric polynomial surface patch,
(II) forming an initial $K^{th}$ order finite forward difference vector for said u-th 3-D parametric polynomial curve segment of v-th 3-D parametric polynomial surface patch, said formation being on the basis of said $K^{th}$ order finite forward difference matrix for said v-th 3-D parametric polynomial surface patch,
(III) defining curve integer decision variables for said x, y and z coordinate directions for said u-th 3-D parametric polynomial curve segment,
(IV) specifying an initial value for each of said u-th curve integer decision variables,
(V) converting said u-th 3-D parametric polynomial curve segment into said discrete set of voxels,
(VI) updating said finite forward difference matrix for the v-th 3-D parametric polynomial surface patch, and
(VII) determining said integer coordinate values in said x, y and z coordinate directions which are closest to said first endpoint of the $(u+1)^{st}$ 3-D parametric polynomial curve segment, said determination of said integer coordinate values being determined on the basis of said surface integer decision variables defined in step (ii) and said first and second decision thresholds.

15. The method of claim 14, wherein step (V) comprises for each integer value of parameter t from o to n,
(1) determining said integer coordinate values in the x, y and z coordinate directions which are closest to a corresponding sample point of said u-th 3-D parametric polynomial curve segment, said determination of said integer x, y and z coordinate values being determined on the basis of said curve integer decision variables and said first and second decision thresholds,
(2) updating said curve integer decision variables using said decision variable increment,
(3) updating said finite forward difference vector for the u-th 3-D parametric polynomial curve segment, formed in step (II),
(4) placing into said discrete 3-D voxel space, said voxel having said integer x, y and z coordinate values determined in step (1), and
(5) repeating in a loop fashion, steps (1), (2), (3) and (4) for the subsequent voxels of said discrete set of n voxels, until said integer coordinate values for last voxel are determined.

* * * * *